United States Patent
Mertens

(10) Patent No.: US 12,544,111 B2
(45) Date of Patent: Feb. 10, 2026

(54) POLYAXIAL SPINAL SCREW

(71) Applicant: AGMSPINE, SIA, Riga (LV)

(72) Inventor: Agris Mertens, Riga (LV)

( * ) Notice: Subject to any disclaimer, the term of this patent is extended or adjusted under 35 U.S.C. 154(b) by 35 days.

(21) Appl. No.: 18/690,731

(22) PCT Filed: Sep. 14, 2021

(86) PCT No.: PCT/IB2021/058345
§ 371 (c)(1),
(2) Date: Mar. 11, 2024

(87) PCT Pub. No.: WO2023/041951
PCT Pub. Date: Mar. 23, 2023

(65) Prior Publication Data
US 2024/0398444 A1    Dec. 5, 2024

(51) Int. Cl.
*A61B 17/70* (2006.01)
(52) U.S. Cl.
CPC ................ *A61B 17/7032* (2013.01)
(58) Field of Classification Search
CPC .................................................. A61B 17/7032
See application file for complete search history.

(56) References Cited

U.S. PATENT DOCUMENTS

| | | | | |
|---|---|---|---|---|
| 10,973,554 B2 * | 4/2021 | Biedermann | ...... | A61B 17/7032 |
| 11,291,477 B1 * | 4/2022 | Rezach | .............. | A61B 17/7035 |
| 11,510,711 B1 * | 11/2022 | Robbins | ............. | A61B 17/8685 |
| 2008/0108992 A1 * | 5/2008 | Barry | ................. | A61B 17/7037 606/103 |
| 2009/0036934 A1 * | 2/2009 | Biedermann | ...... | A61B 17/7037 606/301 |
| 2010/0114180 A1 * | 5/2010 | Rock | .................. | A61B 17/7037 606/308 |
| 2010/0168800 A1 * | 7/2010 | Biedermann | ...... | A61B 17/7037 606/305 |
| 2010/0262196 A1 * | 10/2010 | Barrus | ............... | A61B 17/7037 606/308 |
| 2011/0276098 A1 * | 11/2011 | Biedermann | ...... | A61B 17/7037 606/1 |

(Continued)

FOREIGN PATENT DOCUMENTS

| | | | | | |
|---|---|---|---|---|---|
| EP | 2022423 | B1 * | 7/2010 | ......... | A61B 17/7034 |
| EP | 2574297 | A1 * | 4/2013 | ............. | A61B 17/86 |
| EP | 3501436 | B1 * | 6/2020 | ......... | A61B 17/7037 |

*Primary Examiner* — Jacqueline T Johanas
(74) *Attorney, Agent, or Firm* — Patshegen IP; Moshe Pinchas

(57) ABSTRACT

Invention relates to polyaxial spinal screws for correcting and stabilizing a spinal cord by open and minimally invasive technique. The polyaxial spinal screw comprises a screw shaft (10), a coupling (20), a sleeve (30) and a set screw (50). The coupling (20) has a proximal end (202) and a distal end (203). The coupling (20) comprises a spherical cut (21) sized to receive the screw shaft (10). The coupling (20) further comprises two slots (26) for receiving a stabilizing rod (40). The coupling (20) comprises an inner thread (24) where the set screw (50) is threaded. The sleeve (30) has a proximal end (302) closer to the proximal end (202) of the coupling (20) and a distal end (303). The sleeve (30) comprises at least two slots (32) for receiving a stabilizing rod (40) and at least two recesses (33) for fixation of the polyaxial spinal screw by auxiliary tools.

17 Claims, 28 Drawing Sheets

(56) References Cited

U.S. PATENT DOCUMENTS

| | | | |
|---|---|---|---|
| 2012/0095516 A1* | 4/2012 | Dikeman | A61B 17/7037 |
| | | | 606/305 |
| 2014/0081334 A1* | 3/2014 | Jackson | A61B 17/7035 |
| | | | 606/278 |
| 2016/0030090 A1* | 2/2016 | Webb | A61B 17/7037 |
| | | | 606/266 |
| 2016/0066958 A1* | 3/2016 | Raju | A61B 17/7086 |
| | | | 606/270 |
| 2017/0020574 A1* | 1/2017 | Biedermann | A61B 17/7086 |
| 2018/0036039 A1* | 2/2018 | Biedermann | A61B 17/7037 |
| 2018/0055542 A1* | 3/2018 | Biedermann | A61B 17/7076 |
| 2018/0353213 A1* | 12/2018 | Biedermann | A61B 17/7085 |
| 2018/0368889 A1* | 12/2018 | Cole | A61B 17/7032 |
| 2019/0192192 A1* | 6/2019 | Biedermann | A61B 17/7032 |
| 2019/0274737 A1* | 9/2019 | Biedermann | A61B 17/7037 |
| 2020/0337737 A1* | 10/2020 | Biedermann | A61B 17/863 |
| 2021/0145485 A1* | 5/2021 | Biedermann | A61B 17/7035 |
| 2021/0186569 A1* | 6/2021 | Biedermann | A61B 17/7086 |
| 2021/0186575 A1* | 6/2021 | Biedermann | A61B 17/7086 |
| 2021/0369315 A1* | 12/2021 | Heuer | A61B 17/7037 |
| 2022/0160400 A1* | 5/2022 | Beyar | A61B 17/7032 |
| 2022/0395297 A1* | 12/2022 | Nakada | A61B 17/7032 |

\* cited by examiner

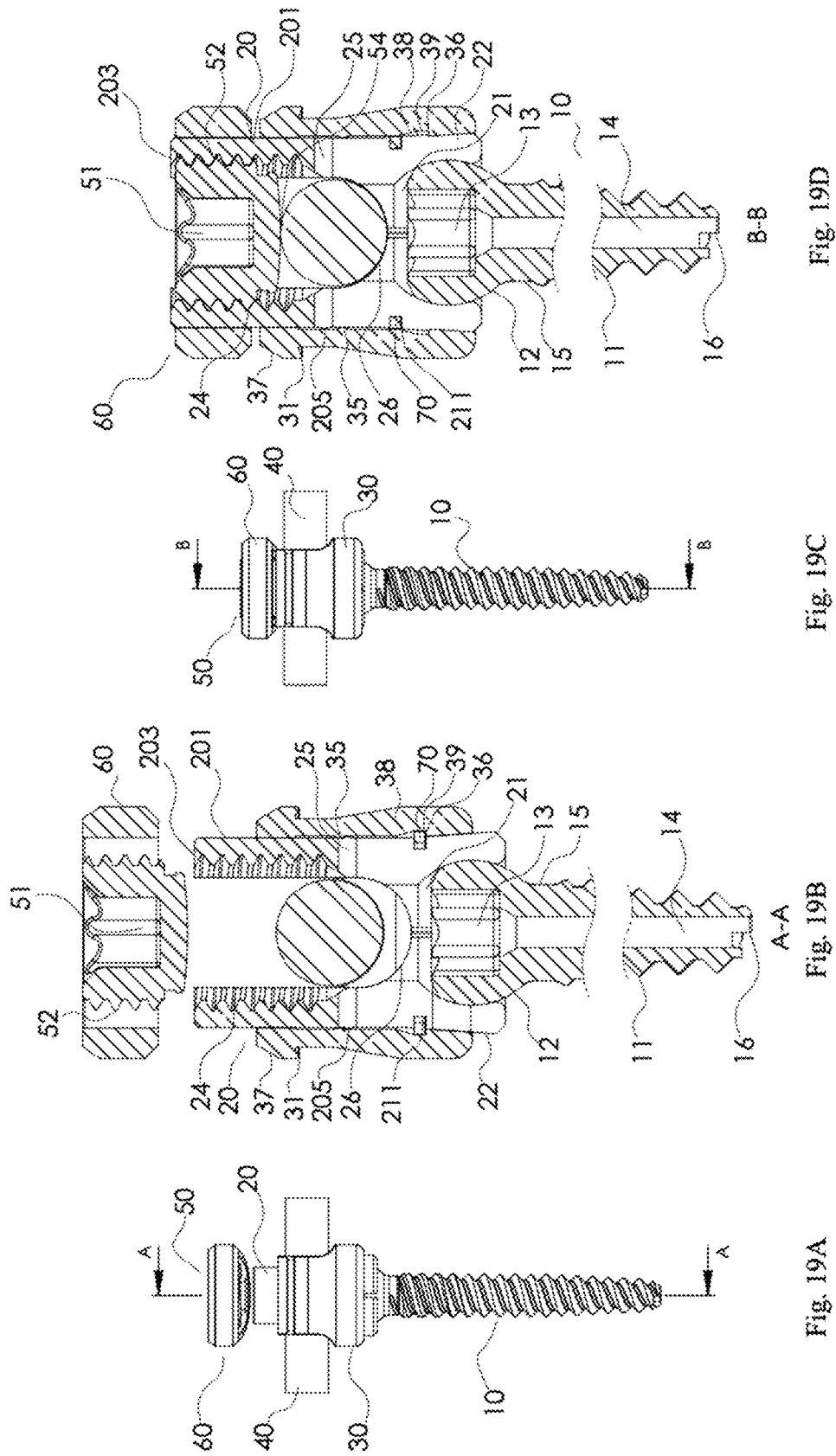

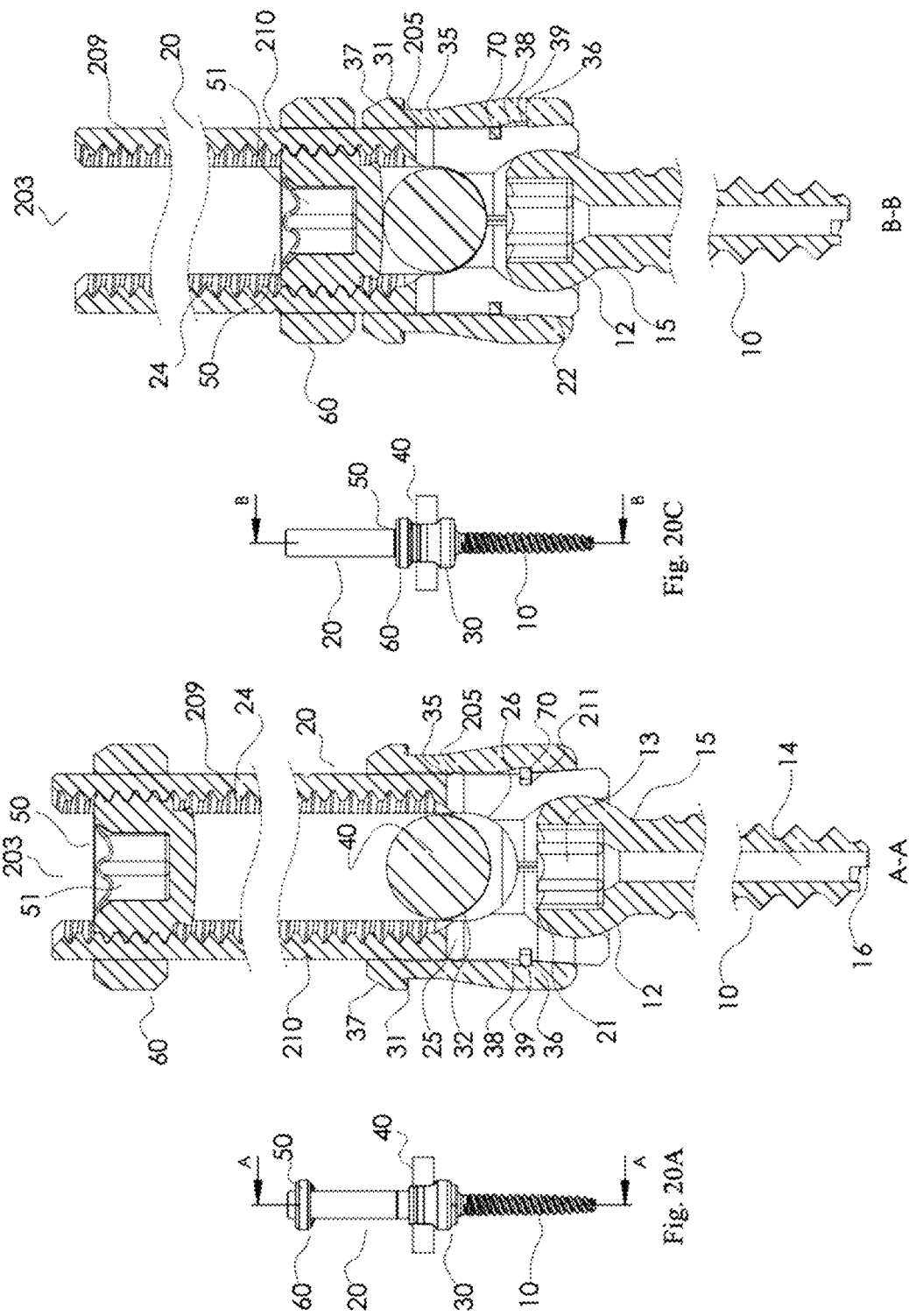

A-A

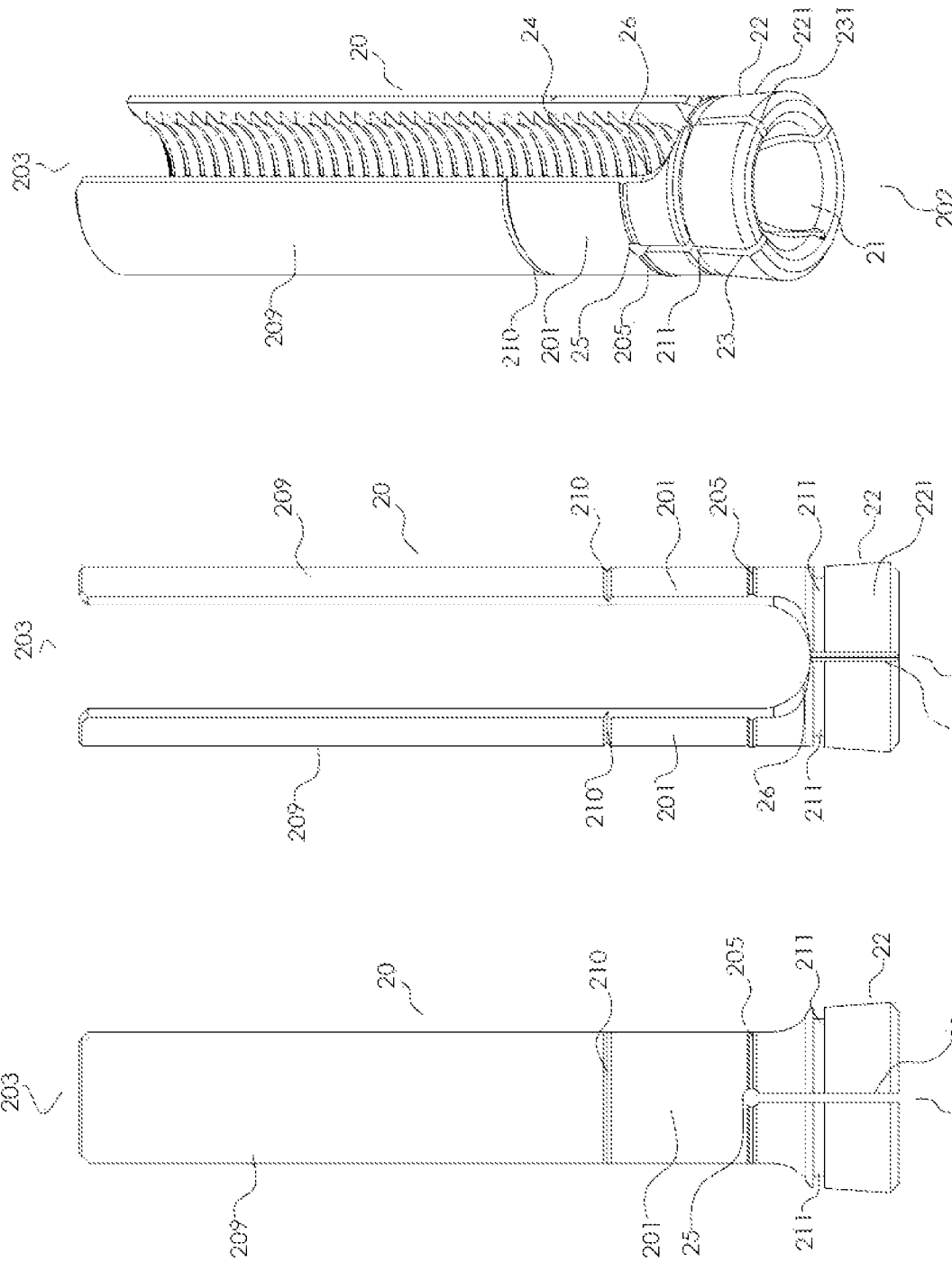

B-B

A-A

POLYAXIAL SPINAL SCREW

FIELD OF THE INVENTION

Invention relates to polyaxial spinal screws for implants, especially to polyaxial spinal screws for correcting and stabilizing a spinal cord by open and minimally invasive technique.

BACKGROUND OF THE INVENTION

Polyaxial bone screws are commonly used in trauma and orthopaedics spinal surgeries, a well-known option for spinal fixation systems. Fixation system is widely used to correct spine structure problems caused by trauma or by other deformities.

The fixation system consists of at least two bone screws connecting at least one stabilizing rods (pre bent to the desired shape for optimal spine support) and polyaxial screws with ability to adjust and fixate the desired angular position to properly accept a stabilizing rod. Angular adjustment of the screw head assembly is possible via ball joint formed between bone screw and the screw head assembly.

United States patent application publication No. US 2005/187548 discloses a pedicle screw comprising: a coupling head having a bore therethrough, the coupling head further including a channel configured for reception of a spinal rod; a tubular sleeve configured for reception in the coupling head bore; a collar configured for releasable fixation onto the coupling head; and a spinal rod retention element configured to be received through the collar and to fix a spinal rod received in the spinal rod channel of the coupling head relative to the coupling head.

U.S. Pat. No. 5,443,467 discloses a bone screw comprising a receiver member and a screw member having a threaded portion and a head having a spherical segment-shaped portion. The receiver member comprises an internal thread (for allowing a relative adjustment of receiver member and screw member and the connection of the receiver member with a round rod. A pressure means acts onto the head and the rod is placed on top of the pressure means. The arrangement is locked by means of a rod locking nut and a lock nut is screwed onto an external thread.

United States patent application publication No. US 2005/0267472 discloses a bone anchoring device with a bone anchoring element which has a shank part and a head, a receiver part for articulated connection of the bone anchoring element to a rod.

United states patent application publication No. US 2014/0358182 discloses a readjust able polyaxial that includes a threaded shaft portion for anchoring the pedicle screw in a vertebra, a fixing device for the selective positional fixation of the mounting sleeve with respect to the shaft portion. The fixing device includes a locking element as well as a counterforce part which is formed so as to be separate from the pedicle screw and counteracts the holding force of the locking element.

United States patent application publication No. US 2017/0340360 discloses an anchor assembly for use in spinal fixation to interconnect a longitudinal spinal rod with a patient's vertebra. The anchor assembly includes a bone anchor, a body with a rod-receiving channel, an insert member and a locking cap.

U.S. Pat. No. 9,011,449 B1 discloses an a pedicle screw and rod fixation assembly including a pair of opposing tabs having a proximal end and a distal end, the pair of opposing tabs being coupled to one another about the distal end thereof by a screw head member, a decoupling mechanism for decoupling the pair of opposing tabs from the screw head member, a rod receiving slot between the pair of opposing tabs, and a sliding member configured for coupling to the pair of opposing tabs.

United States patent application publication No. US 2004/0267264 A1 discloses an a polyaxial fixation device having a Shank with a spherical head formed on a proximal end thereof, and a receiver member having an axial passage formed therein that is adapted to polyaxially Seat the Spherical head of the Shank. The polyaxial bone Screw further includes an engagement member that is adapted to provide sufficient friction between the spherical head and the receiver member to enable the Shank to be maintained in a desired angular orientation before locking the Spherical head within the receiver member.

U.S. Pat. No. 10,004,543 B2 discloses a tulip including a slot to receive a linkage, first and second side walls that define a portion of the slot, and a ring that couples the first side wall to the second side wall; wherein the ring couples to the first side wall at a thinned first proximal fulcrum and to the second side wall at a thinned second proximal fulcrum and the ring pivots about the first and second proximal fulcrums when the ring is forced proximally; wherein the first side wall includes a first sidewall projection that projects past the first proximal fulcrum and the second side wall includes a second sidewall projection that projects past the second proximal fulcrum.

SUMMARY OF THE INVENTION

The present invention is a polyaxial spinal screws for correcting and stabilizing a spinal cord. Polyaxial pedicle screws are commonly used in trauma and orthopedics spinal surgeries, a well-known option for spinal fixation systems using minimally invasive and open techniques. Fixation system is widely used to correct spine structure problems caused by trauma or by other deformities.

The bone screw threads fixate in vertebrae, providing a connection to the spine. Screw head has a spherical or partially spherical head, forming a ball joint type of link between the screw and head assembly. This provides angular adjustment option for the screw head assembly.

Objective of the invention is to create unified fixation system for various sizes of bone screws. Another objective of the invention is to create a low profile, compact bone screw implant system which can be used for minimally invasive fusions.

Objective of the invention is to create a spinal fixation system that ensures an effective fastening of the bone screw and stabilizing rod with a simple head assembly design. Another objective of the invention is to create an implant system that is easy to use.

The objectives are achieved by design of a polyaxial spinal screw for implants for correcting and stabilizing a spinal cord.

The polyaxial spinal screw comprises a screw shaft also known as a pedicle screw, a coupling attached to the screw shaft with ability to rotate, a sleeve mounted onto the coupling and optionally connected with it by a locking ring and a set screw with collar screwed onto the coupling for fixation of the polyaxial spinal screw in a position. The coupling may compromise various embodiments which include the locking ring groove or without it. The polyaxial spinal screw further comprises a stabilizing rod, which is inserted into the coupling and the sleeve, and further fixed by set screw. Coupling extended tabs are kept from bending by a collar which is integral part of the set screw. The stabilizing rod is connection element between the polyaxial spinal screws. Stabilizing rods, formed in the desired shape, connected to the screw head assemblies, provide a rigid support structure for the spine.

The screw shaft has a thread section with a bone thread and a spherical segment-shaped screw head. The screw shaft may comprise various embodiments. In one embodiment the screw shaft comprises a channel extending therethrough in axial direction of the screw shaft that gives possibility of using K-wire for more proper and precision screw insertion into vertebra. In another embodiment the screw shaft comprises a channel extending therethrough in axial direction of the screw shaft and further comprises radial channels extending from the channel to the side surface of the screw shaft. The configuration of the screw shaft depends on the use and specifics for correcting and stabilizing a spinal cord. The screw head further comprises a tool recess for bringing into engagement with a screw driver. The screw shaft size in its diameter and length varies, as specific size must be selected for each case.

The coupling has a bore therethrough forming the coupling as a tube. The coupling has a proximal end that is near the screw shaft when the coupling is assembled onto the screw head of the screw shaft and a distal end opposite to the proximal end of the coupling. The coupling at the proximal end comprises a spherical cut sized to receive the screw head of the screw shaft.

The spherical cut has at least two kerf cuts and at least one full cut spaced in circumferential direction around the coupling resulting in at least two lugs, which extend in the axial direction of the coupling and can be bent outward in an elastic/flexible manner. The spherical cut forms proximal end of the coupling so that it functions as a collet that receives the screw head.

The coupling further comprises a hole formed at end of the kerf cut. A diameter of the hole is larger than a width of the kerf cut. The coupling further comprises two slots open at the distal end of the coupling for receiving a stabilizing rod. The two slots form two walls positioned opposite to each other. The two walls are arranged so to be able to receive the stabilizing rod. The coupling comprises an inner thread on an inner surface at the distal end of the coupling.

The coupling further comprises a step formed on an outer surface of the wall of the coupling and at the distal end of the coupling for preventing the sleeve assembled onto the coupling to fall off or slide out from the coupling.

An outer diameter of the coupling at the proximal end thereof and below the step is larger than an outer diameter of the coupling at the distal end.

In another embodiments width of the slot at the proximal end of the coupling is larger than a width of the slot at the distal end of the coupling in result of which the stabilizing rod can be inserted in locking manner. The stabilizing rod cannot fall out once inserted into the coupling. Form another point of view the width of the slot at the distal end of the coupling is smaller than a diameter of the stabilizing rod to be inserted and a width of the slot at the proximal end of the coupling is larger than stabilizing rod to be inserted in result of which the stabilizing rod can be inserted in locking manner.

The coupling may comprise a downwards movement stopper around the outer surface of the wall of the coupling. During assembly of polyaxial screw and screw insertion into the vertebra, the downwards movement stopper holds the sleeve so it does not fall further down.

In another embodiment, the coupling may comprise a hook formed at each end of the step of the coupling. The hooks hold the sleeve so that the sleeve cannot be pulled out from the coupling.

Also, coupling may comprise a ring groove for the locking ring. Locking ring mounted onto the coupling in this groove can shrink and expand. Sleeve holds by locking ring and cannot be pulled out from the coupling.

The coupling may compromise various embodiments with the extended tabs on the distal end of the coupling. Extended tabs extend out of the patient's body, thereby providing access for connection with the instrument and insertion of the rod through the existing slot. Also, these extended tabs serve for accurate and convenient insertion of a collar and set screw part as they function as guides. Having retaining means, as example a thread, on inner or outer surfaces at the distal end of the tabs, allows to mount the set screw and collar construction into it. This will prevent the set screw and collar from undesired falling down, and perform an unhindered insertion of the rod, since the slot will stay open.

The sleeve has a bore therethrough forming the sleeve as a tube. The sleeve has a proximal end that is closer to the proximal end of the coupling when the sleeve is assembled onto the coupling and a distal end opposite to the proximal end of the sleeve. The sleeve comprises at least two slots open at the distal end of the sleeve for receiving a stabilizing rod and at least two recesses at the distal end of the sleeve. In one of the embodiments of the sleeve, the recesses may be configured for reaching the holes of the coupling when the sleeve is assembled onto the coupling.

The sleeve further comprises at least two, preferably four, positioning notches arranged on an inner surface of the sleeve near the slots for eliminating further rotation of the sleeve and for alignment of the slots of the sleeve with the slots of the coupling.

The sleeve further comprises a circumferential groove arranged on an outer surface of the sleeve. An inner diameter of the sleeve at the proximal end is larger than an inner diameter of the sleeve at the distal end. The inner diameter of the sleeve at the proximal end thereof is smaller than an outer diameter of the coupling at the proximal end thereof in such a manner that upon assembly the sleeve moves onto the coupling and the lugs of the coupling are radially moved within the limits of its elasticity towards the screw head fixating a position of the screw shaft relative to the coupling and the sleeve. In another embodiment, the sleeve instead of a circumferential groove may comprise a tool positioning hole or holes configured to receive a preconfigured surgical tool.

In another embodiment the sleeve saves all the characteristics related to the interaction with the coupling collet. In the distal end of the sleeve in outer shape sliding chamfer helps the preconfigured surgical tool to interact with the tool connection hook. With the special remobilizing surgical tool, which connects to sleeve hooks, the sleeve can be pushed in the longitudinal forward direction to the coupling distal end and the collet which blocks the pedicle screw head will unlock. In that embodiment of the sleeve, it comprises the downwards movement stopper of sleeve onto inner surface which prevents the sleeve from uncontrolled sliding into the proximal direction of the coupling and screw head blocking. Inner sleeve surface comprises a ring compression cone which helps to prevent the forces of the locking ring when the sleeve is being pressed down by a rod during the final tightening of set screw. Next to the ring compression cone is a groove for the locking ring and a upwards movement stopper of sleeve which prevents the sleeve from the sliding up into the distal coupling direction. In that manner construction of the coupling embodiment and the sleeve embodiment with the locking ring grooves and the locking ring between them eliminates the risk of the screw head pop up during the insertion into the vertebra. This is achieved by the distance between the sleeve proximal end and the coupling proximal end. This distance saves the ball joint function and prevents the collet from deformation and opening. Downwards movement stopper of coupling and the downwards movement stopper of sleeve form the distal end and the ring groove with the upwards movement stopper of sleeve from the proximal end works as safety barriers.

The collar comprises a set screw configured to be threaded into the inner thread of the coupling for fixing a stabilizing rod and the assembly of the polyaxial screw. The collar further comprises a flange arranged around the set screw forming a gap between the set screw and the flange. The gap receives the walls of the coupling upon assembly in such way that the walls of the coupling are retained against opening or extension in radial direction. The set screw further comprises a tool recess for engagement with a screw driver. In another embodiment the collar and the set screw may be integral part. In another embodiment, the collar may comprise a circumferential groove on the outer surface of the collar.

In another embodiment where the set screw and collar are integral part the gap between the collar internal walls and the set screw thread is formed to receive the coupling wall with the internal threaded part and the extended tabs or reduction. This gap in combination with the coupling extended tabs and serves as guides for a proper and streamlined set screw insertion. A collar petal serves as anti-torque elements providing longitudinal movement into the coupling proximal direction. Also, these petals are formed to receive and lock the set screw by its safety ledge which provides construction safety. This embodiment of the set screw and collar also serves as an additional holding mechanism in the extended tab coupling embodiment with the upper retaining means as example thread or special ledges on inner or outer surfaces. Mounted on the tab upper retaining means set screw and collar construction forms the rigid slot between the extended tabs and protects the coupling extended tabs from damage or bending during operation. This can be used as additional screw manipulation point as the clear way for stabilizing rod insertion and positioning.

The locking ring is an additional part designed to interact with the coupling embodiment with the ring groove in combination with the sleeve with a groove for the expanded ring. Locking ring design provides the possibility to expand and shrink between the coupling and sleeve interaction. This locking ring stops the sleeve from the longitudinal movement to the distal direction of the coupling. In that way ring also prevents the screw head to pop up from the collet of the coupling.

BRIEF DESCRIPTION OF THE DRAWINGS

The following disclosure will be better understood by a person skilled in the art when read in conjunction with the figures.

FIG. 19A is a side view of pre-assembled polyaxial spinal screw of another embodiment with a shaft 10, coupling 20, sleeve 30, set screw 50 and a collar 60 with a collar gap 66 where the set screw 50 is not tightened yet.

FIG. 19B is a section view of pre-assembled polyaxial spinal screw of another embodiment with a shaft 10, coupling 20, sleeve 30, set screw 50 and a collar 60 with a collar gap 66, locking ring 70 of the FIG. 19A.

FIG. 19C is a side view of assembled polyaxial spinal screw of another embodiment with a shaft 10, coupling 20, sleeve 30, set screw 50 and a collar 60 with a collar gap 66 where the set screw 50 is finally tightened.

FIG. 19D is a s a section view of the assembled polyaxial spinal screw of another embodiment with a shaft 10, coupling 20, sleeve 30, set screw 50 and a collar 60 with a collar gap 66, locking ring 70 of the FIG. 19C FIG. 20A is a side view of pre-assembled polyaxial spinal screw of another embodiment with a shaft 10, coupling 20 with the extended tab 209, sleeve 30, set screw 50 and a collar 60 with the collar gap 66 where the construction of the set screw 50 and a collar 60 is fitted on the extended tabs 209.

FIG. 20B is a section view of pre-assembled polyaxial spinal screw of another embodiment with a shaft 10, coupling 20 with the extended tab 209, sleeve 30, set screw 50 and a collar 60 with the collar gap 66 where the construction of the set screw 50 and a collar 60 is fitted on the extended tabs of the FIG. 20A.

FIG. 20C is a side view of assembled polyaxial spinal screw of another embodiment with a shaft 10, coupling 20 with the extended tab 209, sleeve 30, set screw 50 and a collar 60 with the collar gap 66 where the set screw 50 is finally tightened.

FIG. 20D is a section view of assembled polyaxial spinal screw of another embodiment with a shaft 10, coupling 20 with the extended tab 209, sleeve 30, set screw 50 and a collar 60 with the collar gap 66 where the set screw 50 is finally tightened of the FIG. 20C.

26A is a side view of another embodiment of the coupling 20 with a ring groove 211 and the coupling downwards movement stopper 205.

Figure 26A:
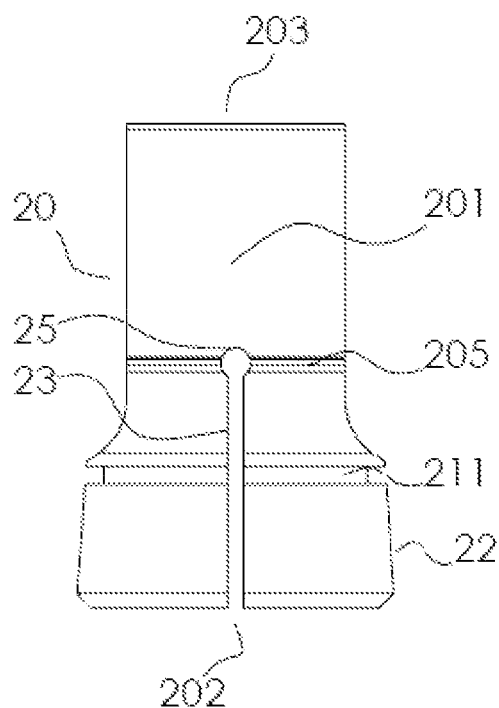
Figure 26B:
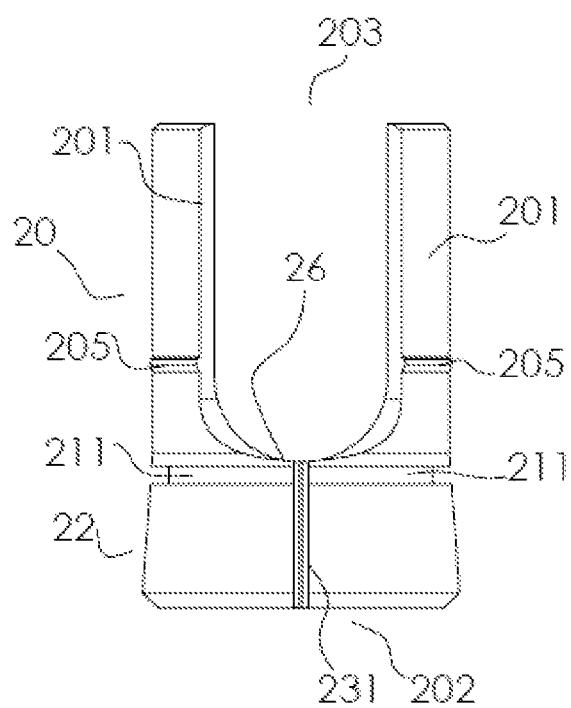

FIG. 26B is a front view of another embodiment of the coupling 20 with the locking ring groove 211 and the coupling downwards movement stopper 205 of the FIG. 26A.

Figure 26C:
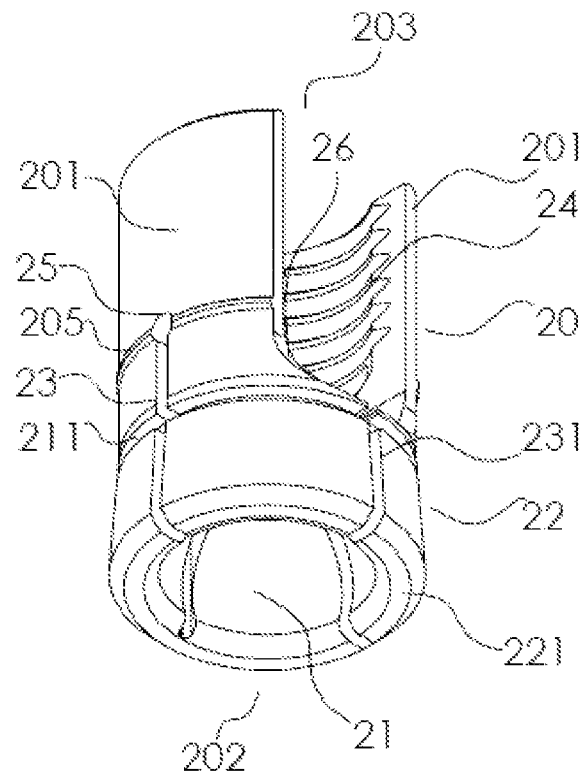

FIG. 26C is a perspective bottom view of another embodiment of the coupling 20 with the ring groove 211 and the coupling downwards movement stopper 205 of the FIG. 26A.

FIG. 27A is a side view of another embodiment of the coupling 20 with extended tabs 209 with the ring groove 211, concentration groove 210 and the coupling downwards movement stopper 205.

FIG. 27B is a front view of another embodiment of the coupling 20 with extended tabs 209 with the ring groove 211, concentration groove 210 and the coupling downwards movement stopper 205.

FIG. 27C is a perspective bottom view of another embodiment of the coupling 20 with extended tabs 209 with the ring groove 211, concentration groove 210 and the coupling downwards movement stopper 205 of the FIG. 27A.

Figure 28A:
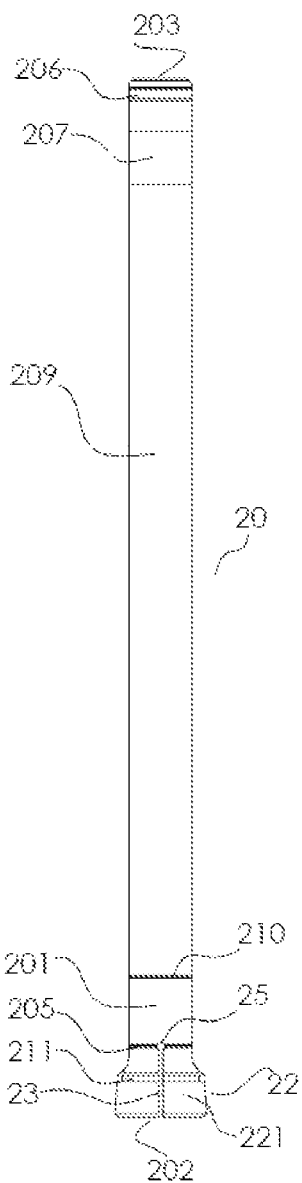

FIG. 28A is a side view of another embodiment of the coupling 20 with extended tabs 209 with the ring groove 211, concentration groove 210, retaining means 208 and the coupling downwards movement stopper 205.

Figure 28B:
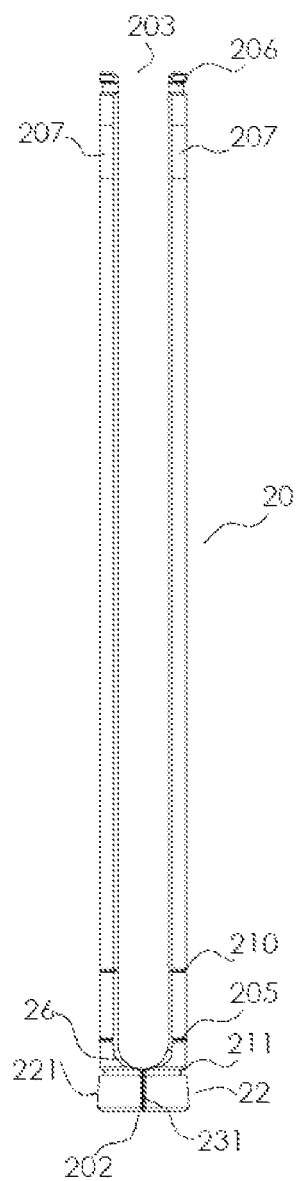

FIG. 28B is a front view of another embodiment of the coupling 20 with extended tabs 209 with the ring groove 211, concentration groove 210, retaining means 208 and the coupling downwards movement stopper 205.

Figure 28C:
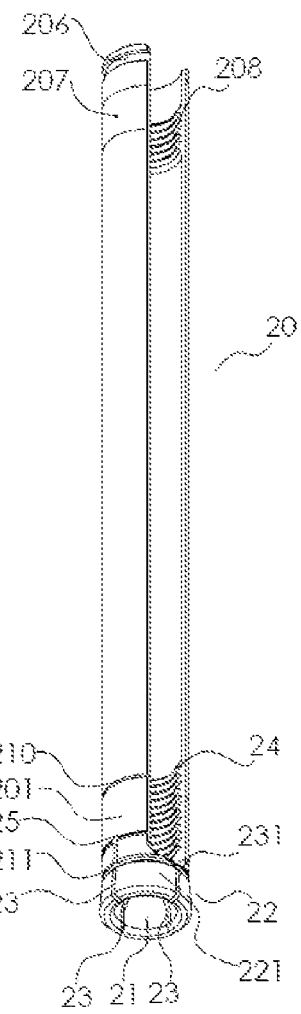

FIG. 28C is a perspective bottom view of another embodiment of the coupling with extended tabs 209 with the ring groove 211, concentration groove 210, retaining means 208 and the coupling downwards movement stopper 205 of the FIG. 28A.

Figure 29A:
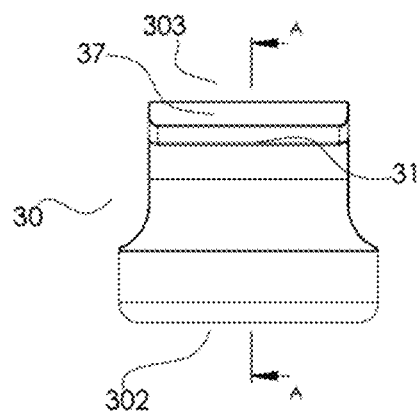

FIG. 29A is a side view of another embodiment of the sleeve 30 which is a sleeve with a sleeve downward movement stopper 35 and upwards movement stopper of sleeve 36 and a groove for the expanded ring 39.

Figure 29B:
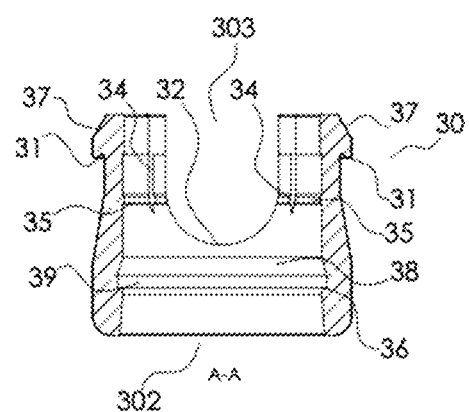

FIG. 29B is a section view of another embodiment of the sleeve 30 which is a sleeve with a sleeve downward movement stopper 35 and a sleeve upwards movement stopper 36 and a groove for the expanded ring 39.

Figure 29C:
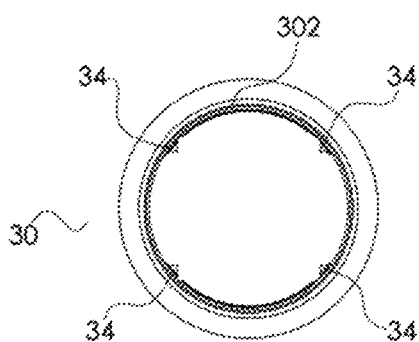

FIG. 29C is a bottom view of another embodiment of the sleeve 30 which is a sleeve with a sleeve downward movement stopper 35 and sleeve upwards movement stopper 36 and a groove for the expanded ring 39 of the FIG. 29A.

Figure 29D:
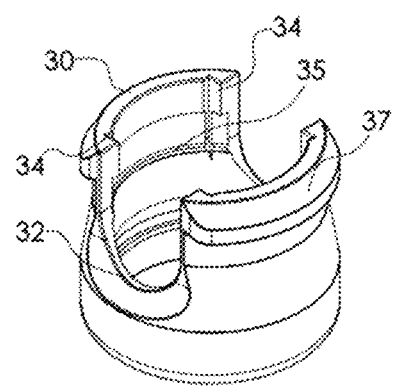

FIG. 29D is a perspective view of another embodiment of the sleeve 30 which is a sleeve with a sleeve downward movement stopper 35 and a sleeve upwards movement stopper 36 and a groove for the expanded ring 39 of the FIG. 29A.

Figure 30C:
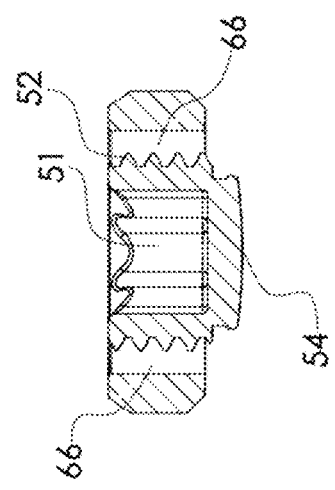
Figure 30B:
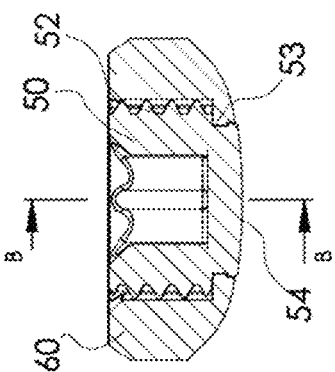
Figure 30A:
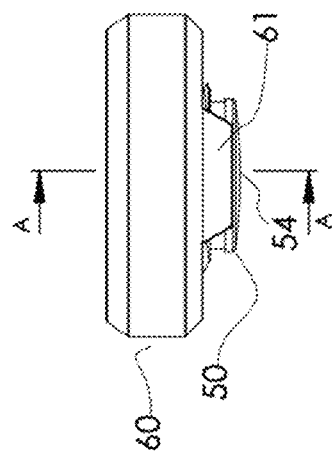

FIG. 30A is a side view of another embodiment of the set screw 50 and collar 60 construction which is a set screw 50 with the pressing surface 54 and a collar 60 with a collar petal 61 and a collar gap 66.

FIG. 30B is a section view of another embodiment of the set screw 50 and collar 60 construction which is a set screw 50 with the pressing surface 54 and a collar 60 with a collar petal 61 and a collar gap 66 of the FIG. 30A.

FIG. 30C is a section view of another embodiment of the set screw 50 and collar 60 construction which is a set screw 50 with the pressing surface 54 and a collar 60 with a collar petal 61 and a collar gap 66 of the FIG. 30B.

Figure 30E:
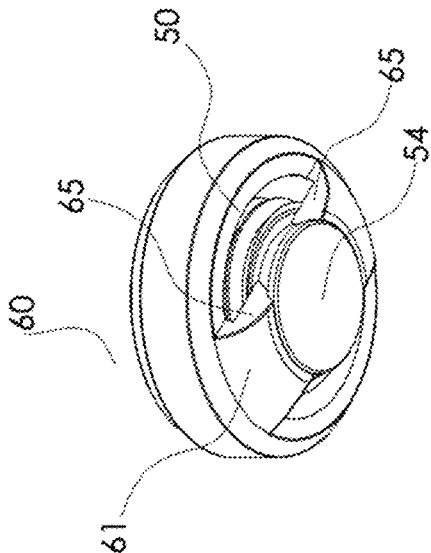
Figure 30D:
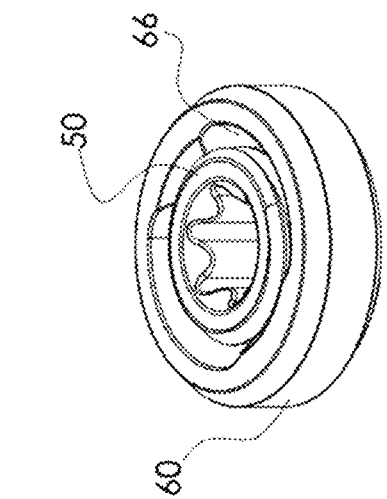

FIG. 30D is a perspective top view of another embodiment of the set screw 50 and collar 60 construction which is a set screw 50 with the pressing surface 54 and a collar 60 with a collar petal 61 and a collar gap 66 of the FIG. 30A.

FIG. 30E is a perspective bottom view of another embodiment of the set screw 50 and collar 60 construction which is a set screw 50 with the pressing surface 54 and a collar 60 with a collar petal 61 and a collar gap 66 of the FIG. 30A.

Figure 31:
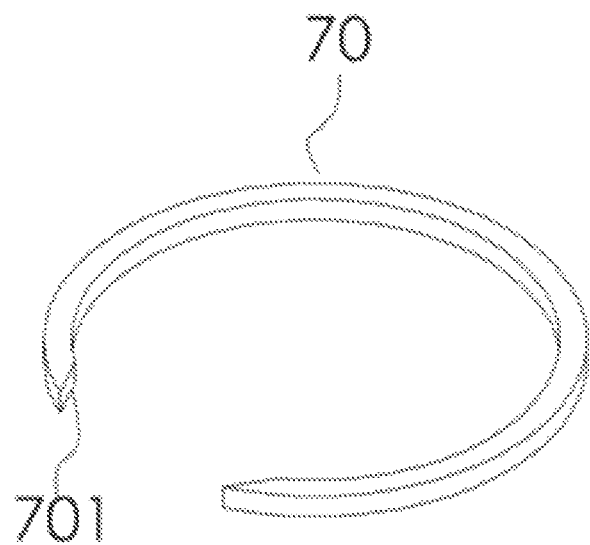

FIG. 31 is a perspective view of the locking ring 70 with the ring recess 701.

DETAILED DESCRIPTION OF THE INVENTION

As can be seen from FIGS. 1, 2A, 2B, 2C, 3, 4A, 4B and 4C, a polyaxial spinal screw has the following parts: a screw shaft 10, a coupling 20, a sleeve 30 and a set screw 50 with a collar 60. The only difference between a set of FIGS. 1, 2A, 2B, 2C and a set of FIGS. 3, 4A, 4B and 4C is that FIGS. 1, 2A, 2B, 2C illustrate fully assembled and tightened polyaxial spinal screw with installed stabilizing rod. Tightening is achieved by the set screw 50. FIGS. 3, 4A, 4B and 4C illustrate assembled but not yet tightened polyaxial spinal screw.

The screw shaft 10 has a thread section 11 with a bone thread and a spherical segment-shaped screw head 12. The screw head 12 comprises a tool recess 13 for bringing into engagement with a screw driver. The screw shaft 10 comprises a channel 14 extending therethrough in axial direction of the screw shaft 10 along a longitudinal axis of thereof. A screw neck 15 is arranged between the screw shaft 10 and the screw head 12 (see FIGS. 2C, 4C and 5). In another embodiment, the shaft 10 comprises self tapping notches 16 at proximal end (see FIGS. 25A, 25B, 25C).

As can be seen from FIGS. 6A, 6B, 6C and 6D, the coupling 20 is design in cylindrical shape that has a bore therethrough. The coupling 20 has a proximal end 202 that is near the screw shaft 10 when the coupling 20 is assembled with a screw head 12 of the screw shaft 10. The coupling 20 has a distal end 203 opposite to the proximal end 202 of the coupling 20. The coupling 20 at the proximal end 202 comprises a spherical cut 21 sized to receive the screw head 12 of the screw shaft 10. The spherical cut 21 has two kerf cuts 23 and one full cut 231 spaced in circumferential direction around the coupling 20 resulting in at least two lugs 221 that extend to each other in the axial direction of the coupling 20 and can be bent outward in an elastic or flexible manner. The following design resembles principles of a collet 22. Therefore, the following set of features—the spherical cut 21, kerf cuts 23 and the full cut 231—form the collet 22 of the coupling 20. The coupling 20 further comprises a hole 25 formed at end of the kerf cut 23. A diameter of the hole 25 is larger than a width of the kerf cut 23.

The coupling 20 further comprises two slots 26 formed therein. The slots 26 are open at the distal end 203 of the coupling 20 for receiving the stabilizing rod 40. The two slots 26 form two walls 201 of the coupling 20 positioned opposite to each other. The coupling 20 further comprises an inner thread 24 on an inner surface of the two walls 201 and at the distal end 203 of the coupling 20.

The coupling 20 further comprises a boss 28 formed at the distal end 203 of the coupling 20 on an inner surface of both walls 201 of the coupling 20. The boss 28 of both walls 201 extends radially inwards towards a longitudinal axis of the coupling 20. A distance between the bosses 28 of both walls 102 is smaller than a diameter of the stabilizing rod 40 to be inserted into the coupling 20 so that the stabilizing rod 40 can be inserted in locking manner. Inserted stabilizing rod 40 would not fall out once inserted into the coupling 20 during medical manipulations with the polyaxial screw or screws. The boss 28 comprises a chamfer 29 for easing insertion of the stabilizing rod 40 into the slots 26 of the coupling 20.

The coupling 20 further comprises a step 27 formed at the distal end 203 of the coupling 20 on an outer surface of both walls 201 and extends radially outward from both walls 201 of the coupling 20 for restricting an axial movement of the sleeve 30 when the sleeve 30 is assembled or put on the coupling 20.

An outer diameter of the coupling 20 at the proximal end 202 thereof is larger than an outer diameter of the coupling 20 formed by two walls 201. The following feature eases an assembly of the coupling 20 with the sleeve 30 as well as provides gradual increase of pressure onto the head 12 of the screw shaft 10 when the sleeve 30 is moved along the coupling 20 towards the screw shaft 10.

Figure 7A:
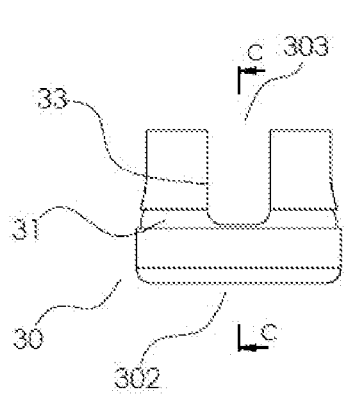
FIG. 7A is a side view of a sleeve 30.
Figure 7B:
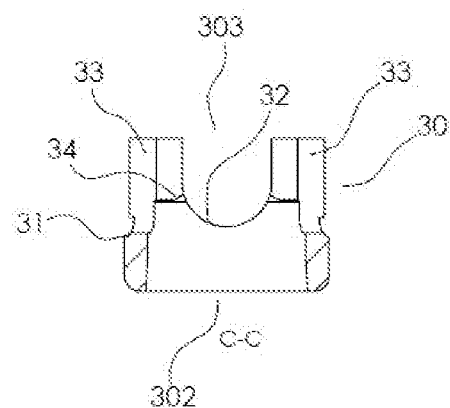
FIG. 7B is a sectional view of the sleeve 30 of FIG. 7A.
Figure 7C:
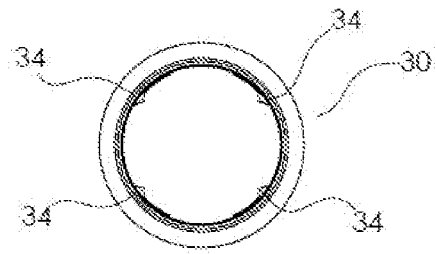
FIG. 7C is a bottom view of the sleeve 30 of FIG. 7A.
Figure 8A:
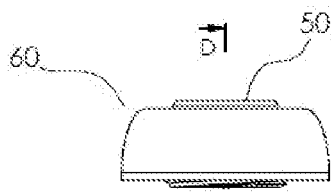
FIG. 8A is a side view of a collar 60 with the set screw 50.
Figure 8B:
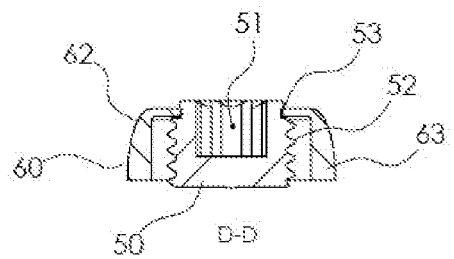
FIG. 8B is a sectional view of the collar 60 with the set screw 50 of FIG. 8A.
Figure 8C:
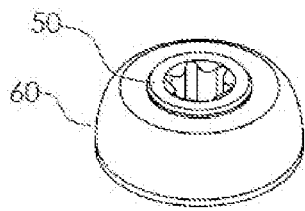
FIG. 8C is a top view of the collar 60 with the set screw 50 of FIGS. 8A and 8B.
Figure 8D:
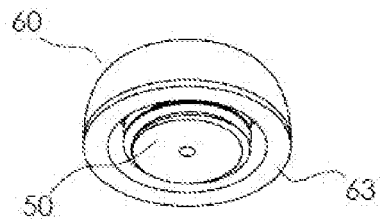
FIG. 8D is a bottom view of the collar 60 with the set screw 50 of FIGS. 8A-8C.

As can be seen from FIGS. 7A, 7B and 7C, the sleeve 30 is design in cylindrical shape that has a bore therethrough similar to the coupling 20. The sleeve 30 has a proximal end 302 that is closer to the proximal end 202 of the coupling 20 when both parts are assembled. A distal end 303 of the sleeve 30 is opposite to the proximal end 302 of the sleeve 30. The sleeve 30 comprises four slots 32 and 33 open at the distal end 303 of the sleeve 30 for receiving the stabilizing rod 40 and for reaching the holes 25 of the coupling 20 upon assembly of the sleeve 30 onto the coupling 20. The stabilizing rod 40 rests on two slots 32 of the sleeve 30. Another two slots 33 are configured for reaching the holes 25 of the coupling 20 by auxiliary tools even after assembly of the sleeve 30 onto the coupling 20. The sleeve 30 further comprises four positioning notches 34 arranged on an inner surface of the sleeve 30 near the slots 32 and 33 for alignment of the slots 32 and 33 of the sleeve 30 with the holes 25 of the coupling 20 when the sleeve 30 is assembled onto the coupling 20. In result of which the holes 25 of the coupling 20 can be reached by auxiliary tools even after assembly.

The sleeve 30 further comprises a circumferential groove 31 arranged on an outer surface of the sleeve 30.

An inner diameter of the sleeve 30 at the proximal end 302 thereof is larger than an inner diameter of the sleeve 30 at the distal end 303 thereof.

The inner diameter of the sleeve 30 at the proximal end 302 of the sleeve 30 is smaller than an outer diameter of the coupling 20 at the proximal end 202 of the coupling 20 so that upon assembly the sleeve 30 is moved onto the coupling 20 and the lugs 221 of the collar 22 of the coupling 20 are radially moved inwards within the limits of its elasticity towards the screw head 12 fixating a position of the screw shaft 10 relative to the coupling 20 and the sleeve 30.

As can be seen from FIGS. 8A, 8B, 8C and 8D, the set screw 50 configured to be threaded into the inner thread 24 of the coupling 20 for fixing a stabilizing rod 40 in its position. The set screw 50 further comprises the collar 60. The collar 60 and the set screw 50 is attached to each other via connection point 53. The collar 60 further comprises a flange 63 arranged around the set screw 50 forming a gap between the set screw 50 and the flange 63 and the flange 63 is covering a threaded portion 52 of the set screw 50. The gap receives the walls 201 of the coupling 20 when a collar 60 with a set screw 50 is put on the walls 201 of the coupling 20. The set screw 50 further comprises a tool recess 51 for bringing into engagement with a screw driver. The collar 60 further comprises a fillet 62 on the outer corner of the collar 60.

Figures 5A, 5B, 5C:
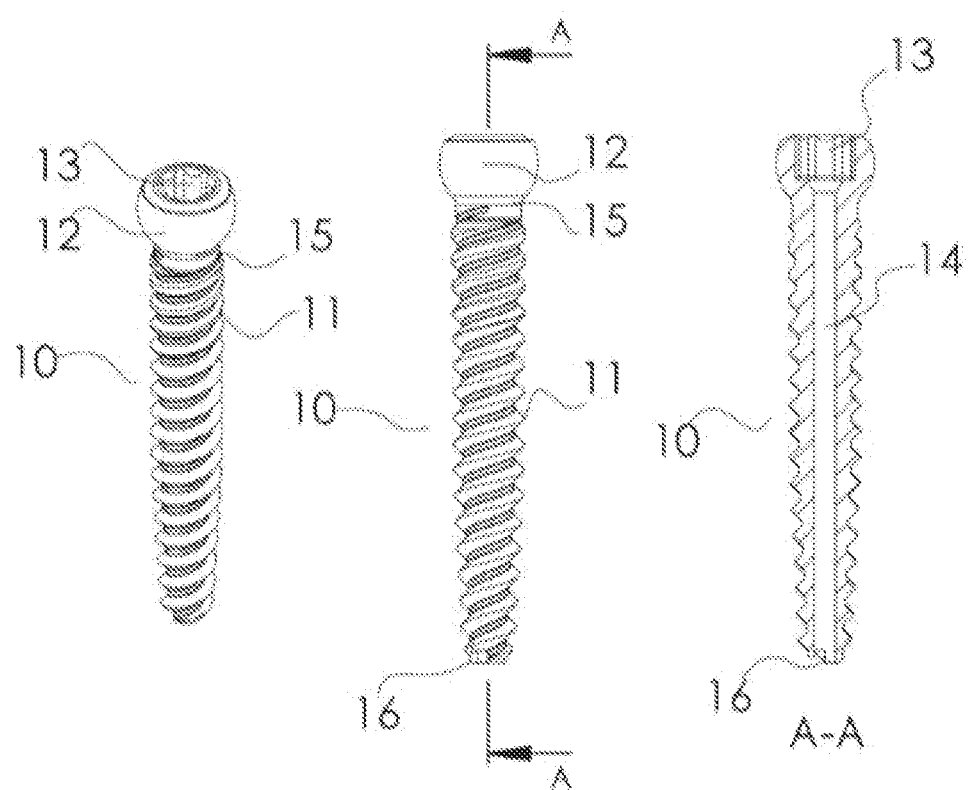
FIG. 5A is a perspective view of the screw shaft 10.
FIG. 5B is a side view of the screw shaft 10.
FIG. 5C is a cross section view the of screw shaft 10 of FIG. 5B.
Figure 6A:
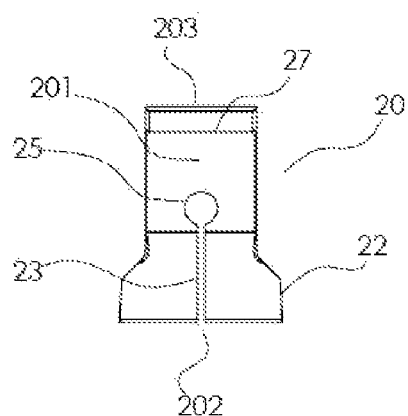
FIG. 6A is a side view of a coupling 20.
Figure 6B:
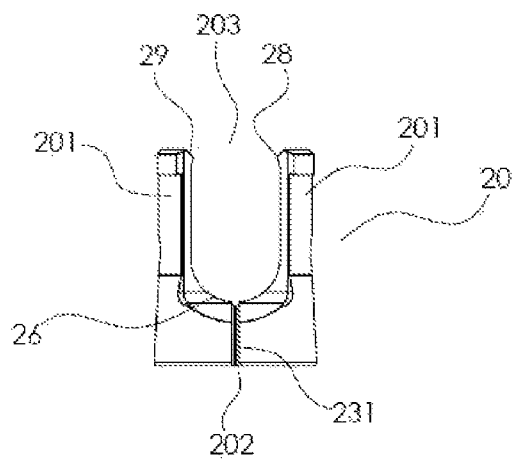
FIG. 6B is another side view of the coupling 20 of FIG. 6A.
Figure 6C:
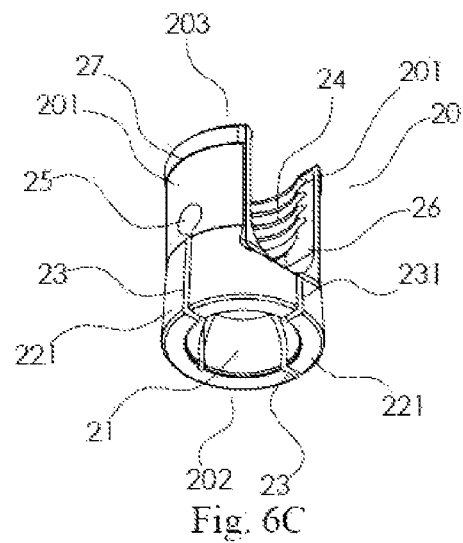
FIG. 6C is a bottom perspective view of the coupling 20 of FIGS. 6A and 6B.
Figure 6D:
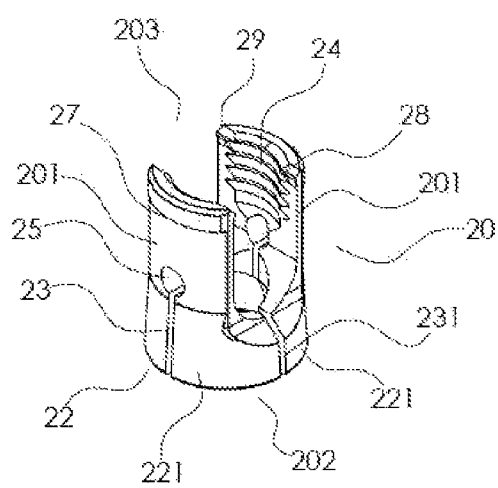
FIG. 6D is a top perspective view of the coupling 20 of FIGS. 6A-6C.
Figure 13A:
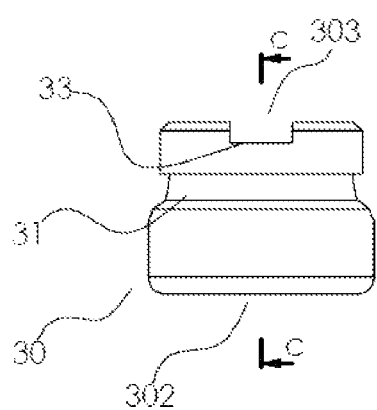
FIG. 13A is a side view of a sleeve 30 of another embodiment, characterized in that it comprises a circumferential groove 31.
Figure 13B:
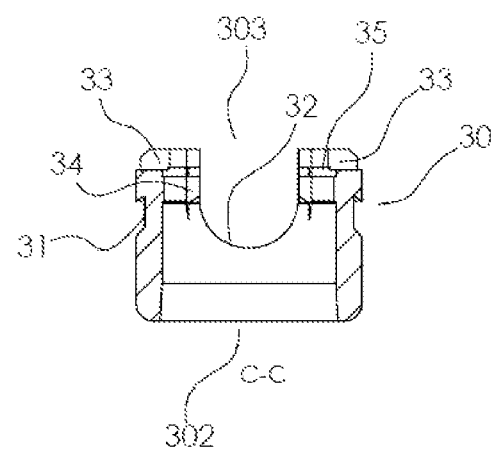
FIG. 13B is a sectional view of the sleeve 30 of FIG. 13A.
Figure 13C:
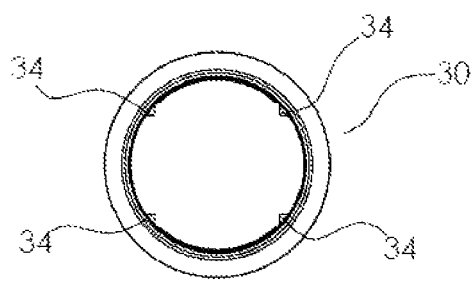
FIG. 13C is a bottom view of the sleeve 30 of FIGS. 13A and 13B.
Figure 14A:
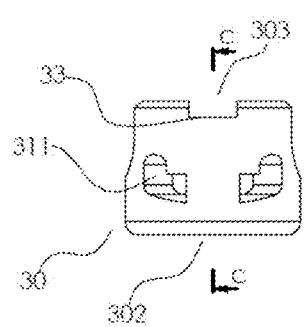
FIG. 14A is a side view of a sleeve 30 of another embodiment, characterized in that it comprises four tool positioning holes 311.
Figure 14B:
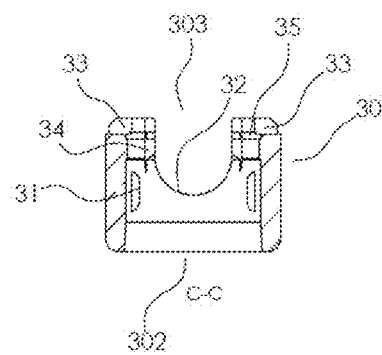
FIG. 14B is a sectional view of the sleeve 30 of FIG. 14A.
Figure 14C:
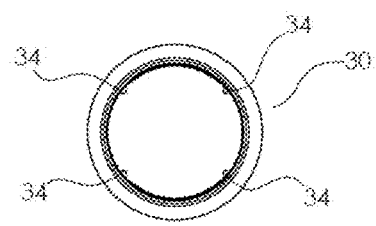
FIG. 14C is a bottom view of the sleeve 30 of FIGS. 14A and 14B.
Figure 14D:
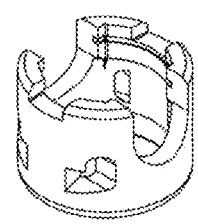
FIG. 14D is top perspective view of the sleeve 30 of FIGS. 14A to 14D.

In another embodiment, as can be seen from FIGS. 9, 10A, 10B, 10C, 11A, 11B and 11C, a polyaxial spinal screw has the following parts: the screw shaft 10 as illustrated in FIG. 5, the coupling 20 as illustrated in FIGS. 12A, 12B, 12C and 12D, the sleeve 30 as illustrated in FIGS. 13A, 13B and 13C, and the set screw 50 with the collar 60 as illustrated in FIGS. 17A, 17B, 17C and 17D. In FIGS. 9, 10A, 10B, 10C the polyaxial spinal screw is in assembled state, but in FIGS. 11A, 11B and 11C the polyaxial spinal screw is in preassembled. Tightening in assembled state is achieved in combination by the set screw 50, which is tightened, and the collar 60, which upon tightening is pushed onto the coupling 20.

The coupling 20 of FIGS. 12A to 12D is another embodiment of the coupling 20, which distinguishes from the coupling 20 of FIGS. 6A to 6D. The coupling 20 further comprises the coupling downwards movement stopper 205 and a hook 204 on each end of a step 27 of the coupling 20.

The sleeve 30 may be made in various embodiments while remaining within the scope of the invention. In one embodiment as illustrated in FIGS. 13A to 13C, the sleeve 30 comprises a circumferential groove 31. The circumferential groove 31 is positioned on the outer surface of the sleeve 30 so that the recesses 33 do not divide the circumferential groove 31 in separate segments.

In another embodiment as seen in FIGS. 14A to 14D, the sleeve 30 instead of the circumferential groove 31 comprises four tool positioning holes 311. The tool positioning holes 311 are designed so that the holes are able to receive and hold necessary surgical tooling.

Figure 15A:
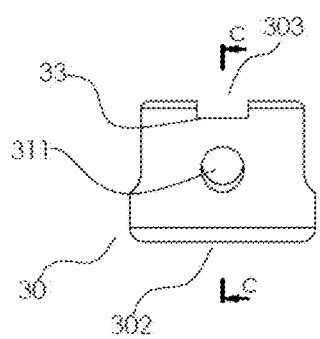
FIG. 15A is a side view of a sleeve 30 of another embodiment, characterized in that it comprises two tool positioning holes 311 opposed to each other.
Figure 15B:
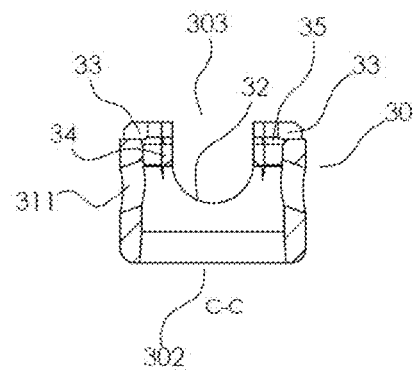
FIG. 15B is a sectional view of the sleeve 30 of FIG. 15A.
Figure 15C:
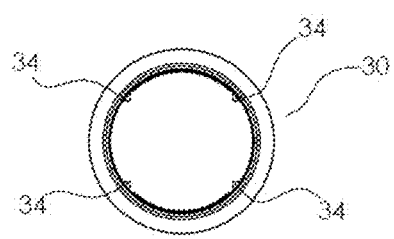
FIG. 15C is a bottom view of the sleeve 30 of FIGS. 15A and 15B.

In another embodiment as seen in FIGS. 15A to 15C, the sleeve 30 comprises two tool positioning holes 311 opposed to each other. The tool positioning holes 311 are also configured to receive and hold necessary surgical tooling.

Figure 16A:
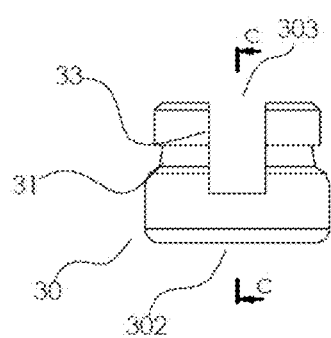
FIG. 16A is a side view of a sleeve 30 of another embodiment, characterized in that it comprises a circumferential groove 31 which is divided by two slots 32 and two recesses 33.
Figure 16B:
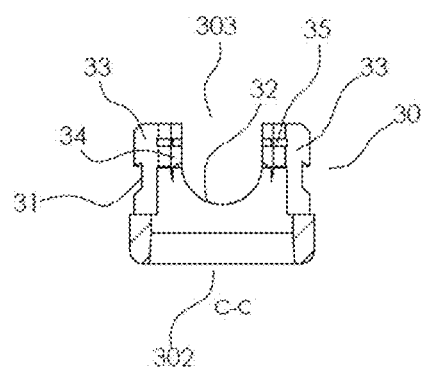
FIG. 16B is a sectional view of the sleeve 30 of FIG. 16A.
Figure 16C:
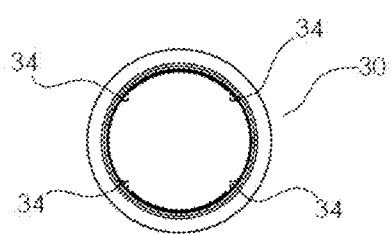
FIG. 16C is a bottom view of the sleeve 30 of FIGS. 16A and 16B.
Figure 16D:
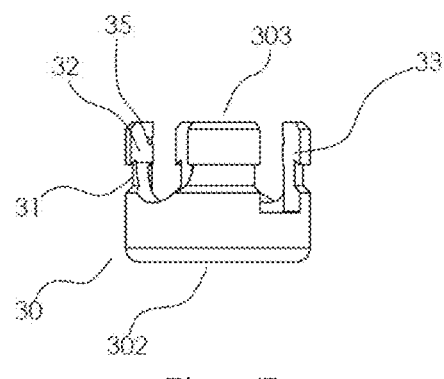
Figure 17A:
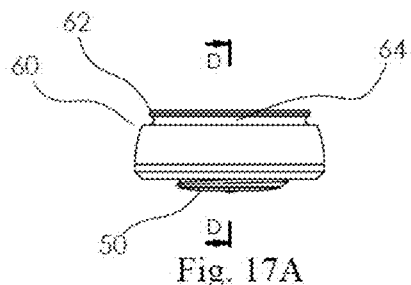
FIG. 17A is a side view of a collar 60 of another embodiment, characterized in that it comprises a circumferential groove 64.
Figure 17B:
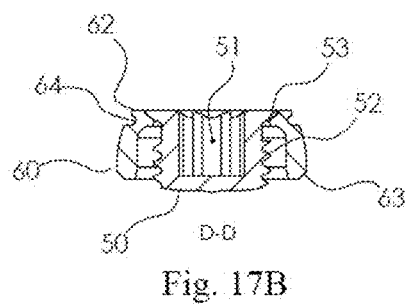
FIG. 17B is a sectional view of the collar 60 with the set screw 50 of FIG. 17A.
Figure 17C:
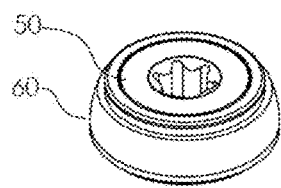
FIG. 17C is a top perspective view of the collar 60 with the set screw 50 of FIGS. 17A and 17B.
Figure 17D:
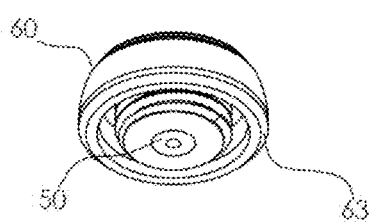
FIG. 17D is a bottom perspective view of the collar 60 with the set screw 50 of FIGS. 17A-17C.

In another embodiment as seen in FIGS. 16A to 16C, the sleeve 30 comprises a circumferential groove 31. The circumferential groove 31 is positioned on the outer surface of the sleeve 30 so that two slots 32 and two recesses 33 divide the circumferential groove 31 in four separate segments.

The sleeves 30 as illustrated in FIGS. 13A to 16C comprises a sleeve downwards movement stopper 35 positioned on the inner surface of said sleeve 30. The sleeve downwards movement stopper 35 is configured to hold onto the coupling downwards movement stopper 205, when the polyaxial spinal screw is in the preassembled state, i.e., the set screw 50 is not yet tightened. The collar 60 of FIGS. 17A to 17D is another embodiment of the collar 60, which distinguishes from the collar 60 of FIGS. 8A to 8D in that the collar 60 further comprises a circumferential groove 64.

Figure 1:
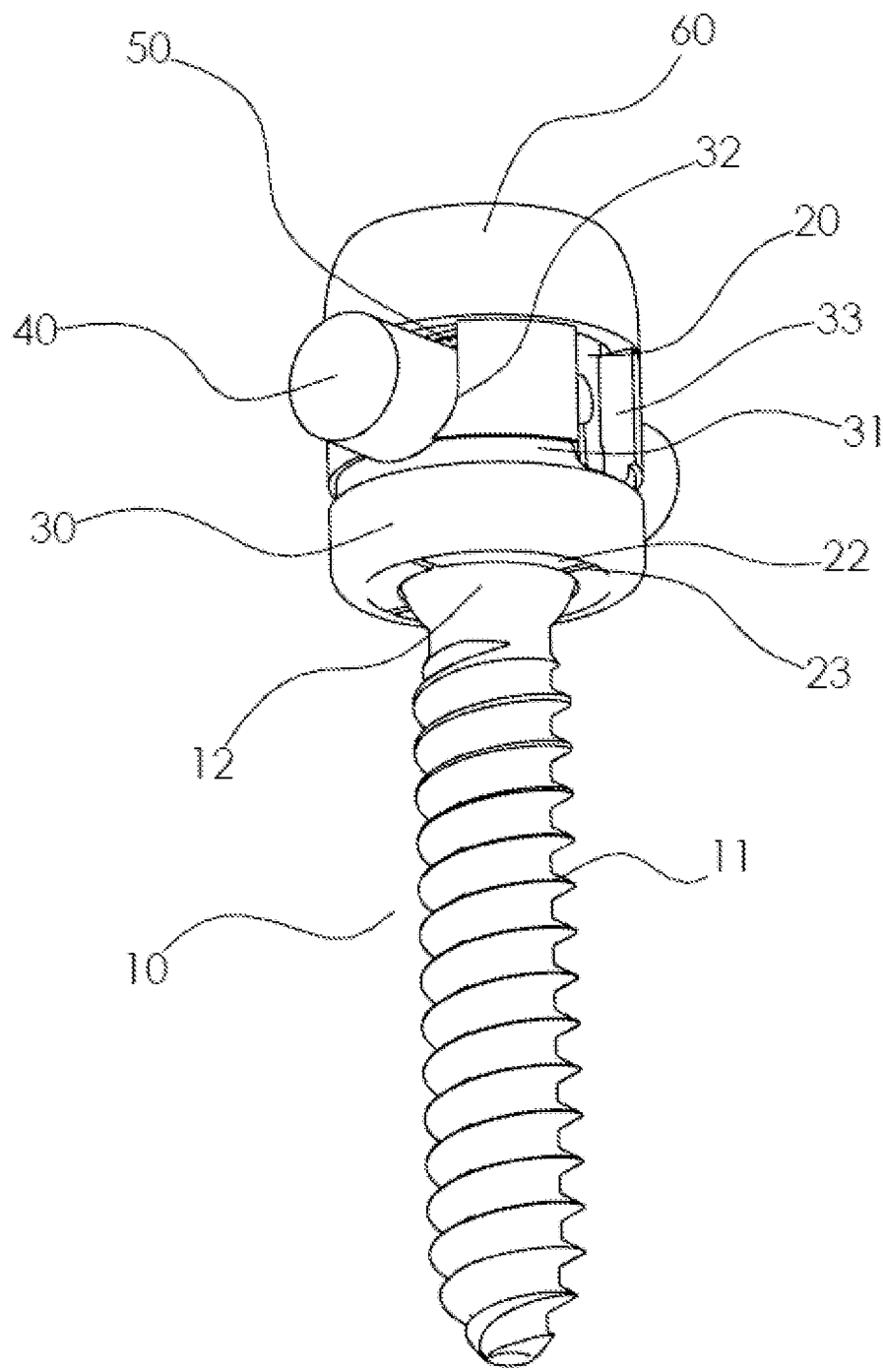
FIG. 1 is a perspective view of assembled polyaxial spinal screw.
Figure 2C:
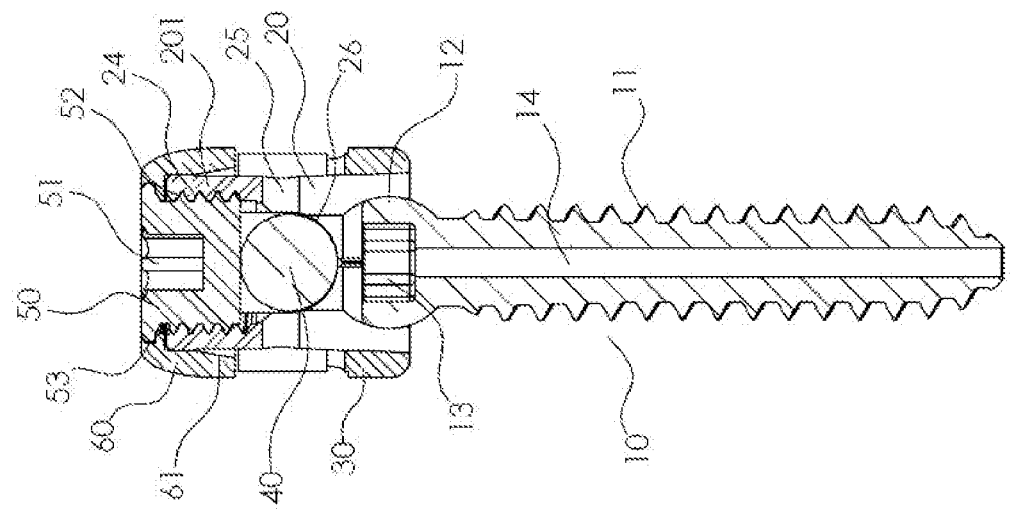
FIG. 2C is a sectional view of assembled polyaxial spinal screw of FIGS. 2A and 2B.
Figure 2B:
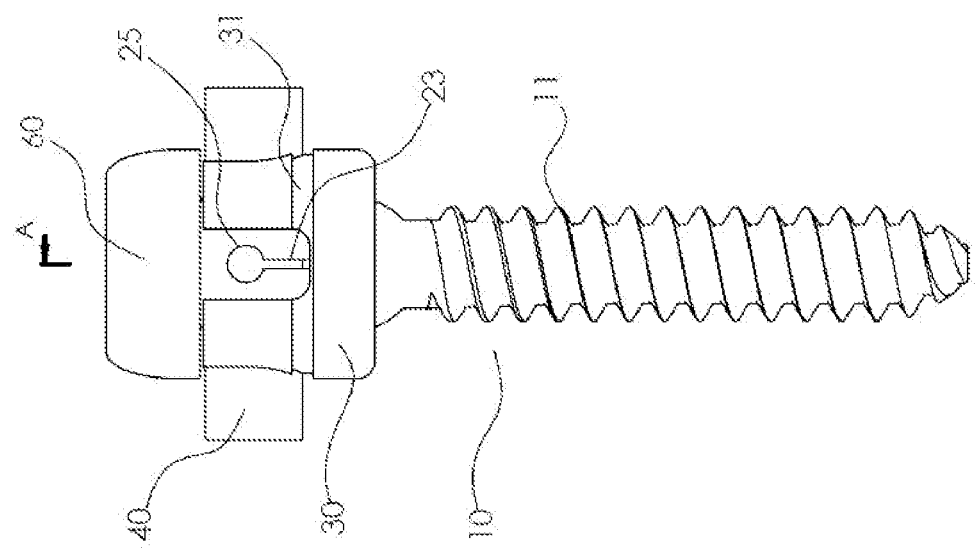
FIG. 2B is another side view of assembled polyaxial spinal screw of FIG. 2A.
Figure 2A:
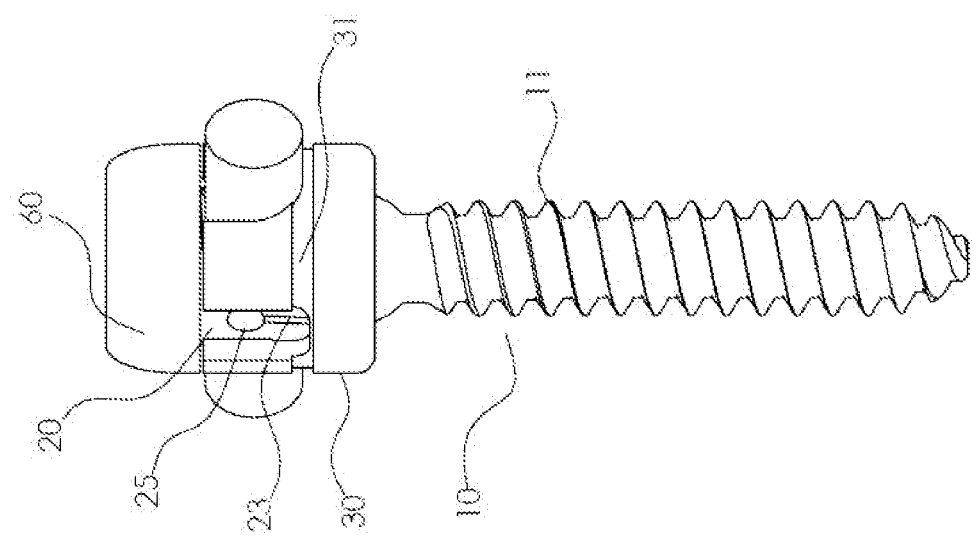
FIG. 2A is a side view of assembled polyaxial spinal screw.
Figure 3:
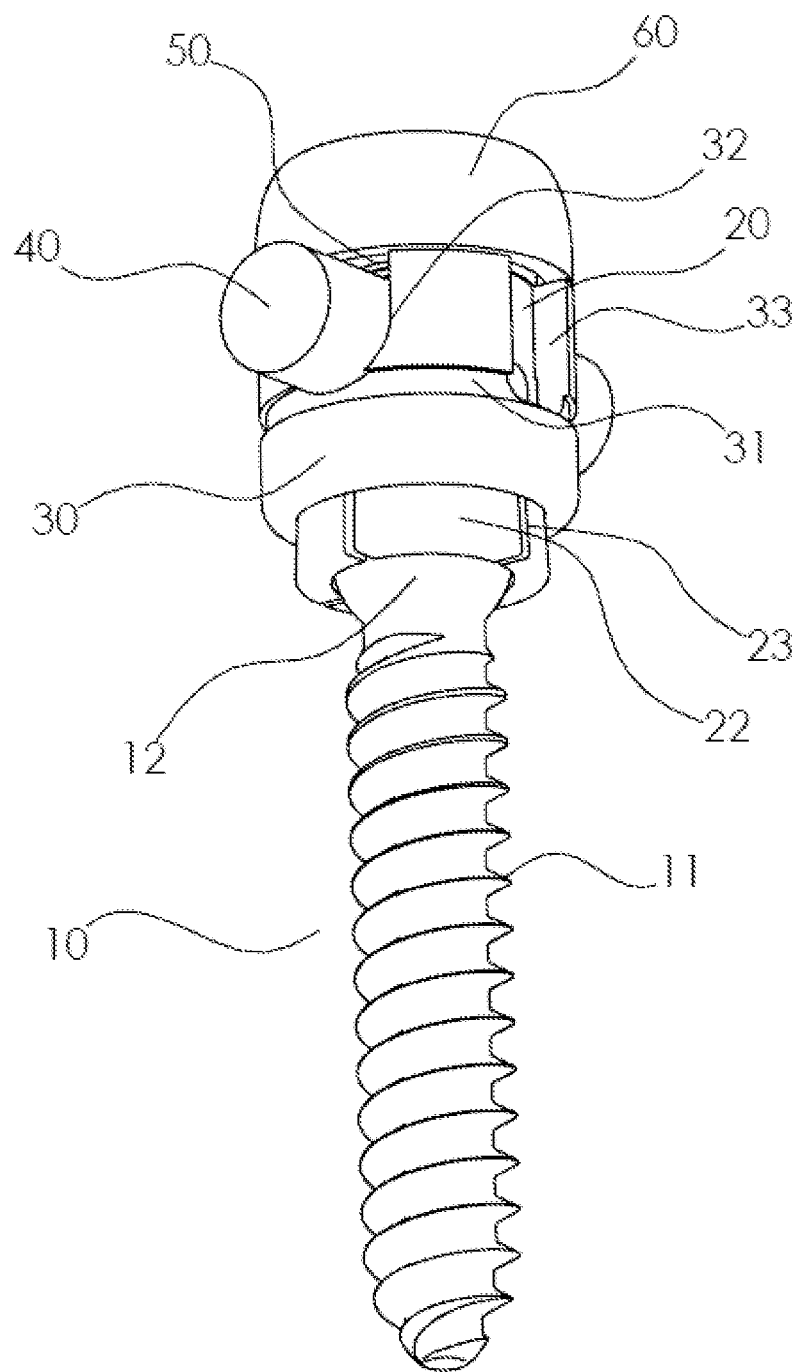
FIG. 3 is a perspective view of pre-assembled polyaxial spinal screw where a set screw 50 is not tightened yet.
Figure 4A:
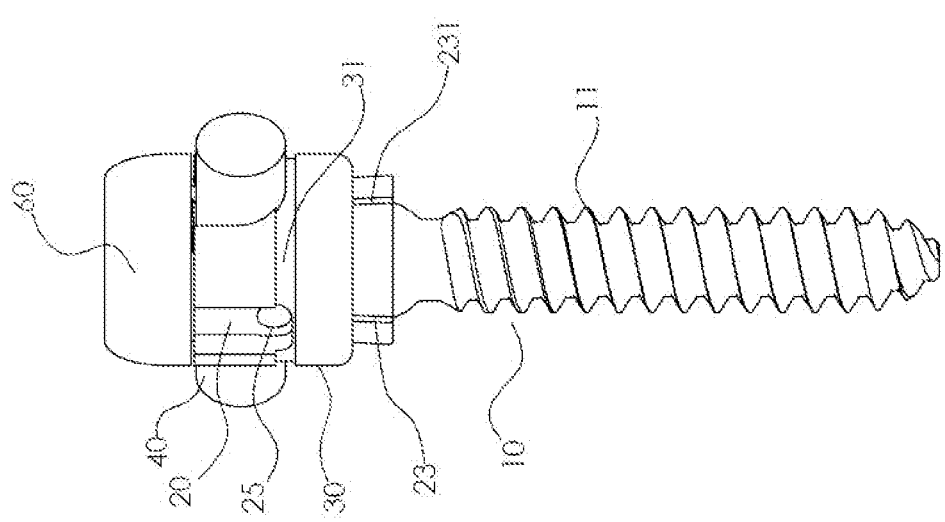
FIG. 4A is a side view of pre-assembled polyaxial spinal screw where a set screw 50 is not tightened yet.
Figure 4B:
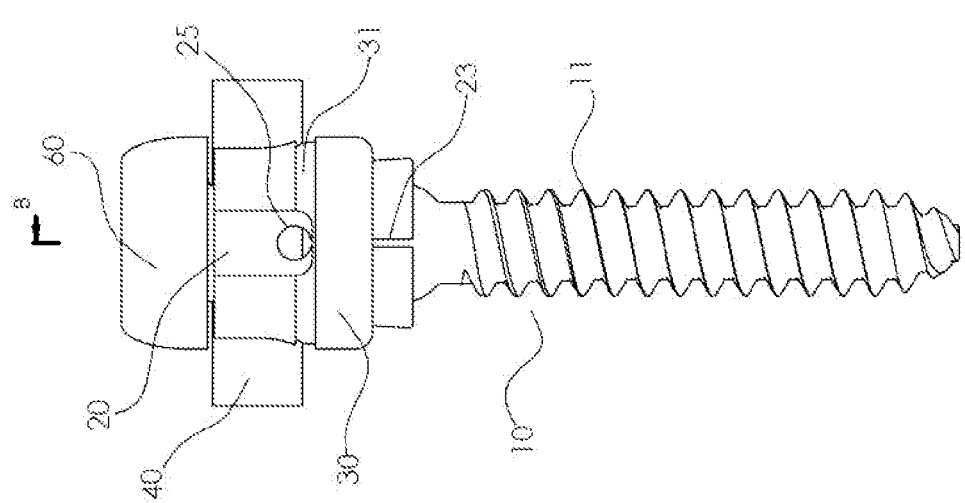
FIG. 4B is another side view of pre-assembled polyaxial spinal screw of FIG. 4A, where the set screw 50 is not tightened yet.
Figure 4C:
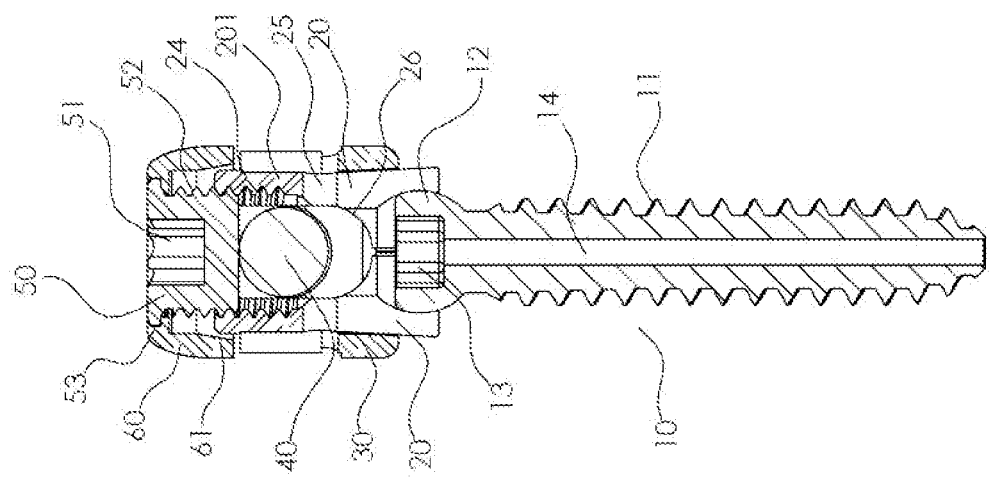
FIG. 4C is a sectional view of pre-assembled polyaxial spinal screw of FIGS. 4A and 4B, where the set screw 50 is not tightened yet.
Figure 9:
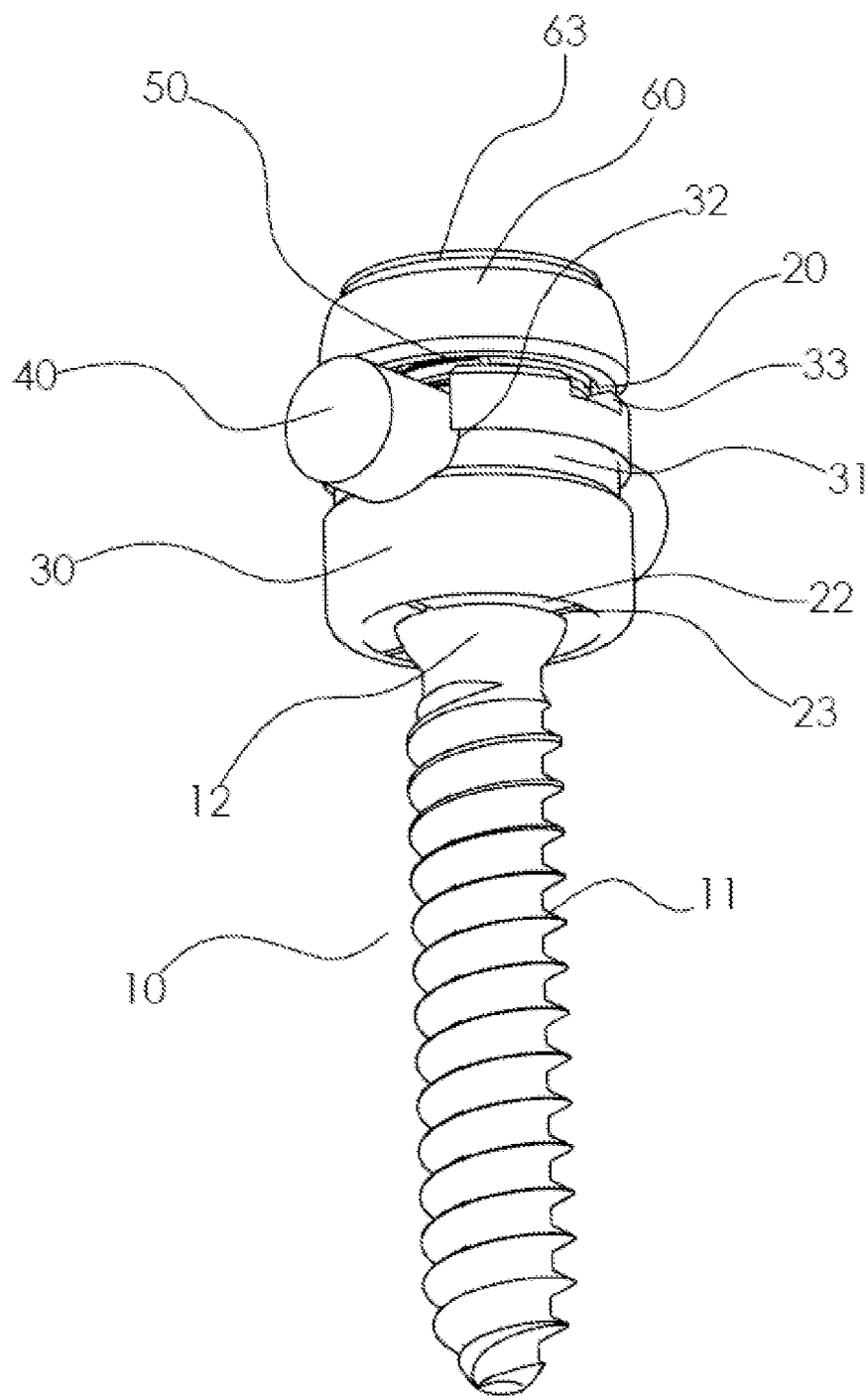
FIG. 9 is a perspective view of assembled polyaxial spinal screw of another embodiment.
Figure 10A:
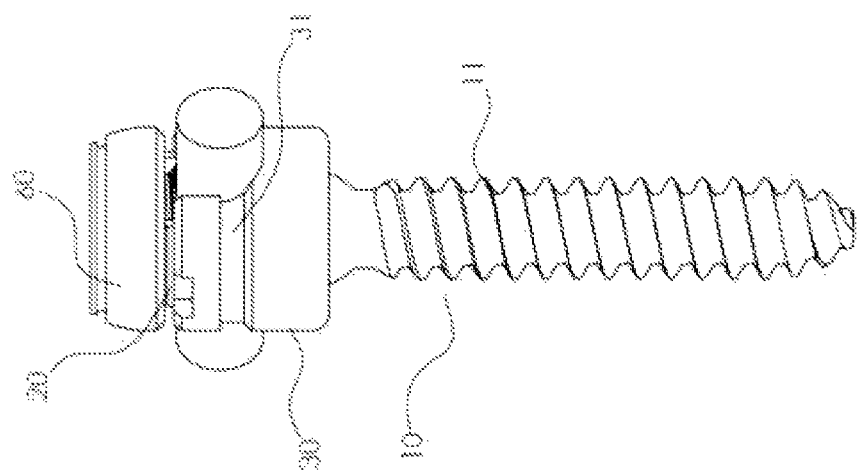
FIG. 10A is a side view of assembled polyaxial spinal screw as shown in FIG. 9.
Figure 10B:
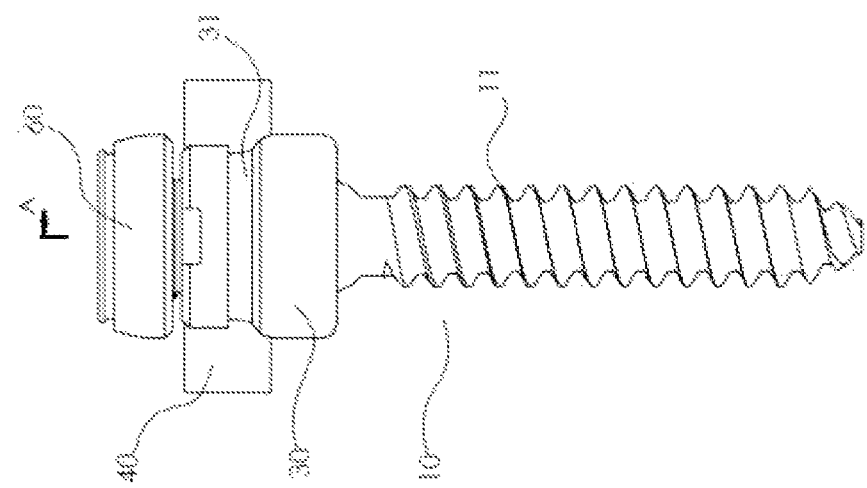
FIG. 10B is another side view of assembled polyaxial spinal of FIG. 10B.
Figure 10C:
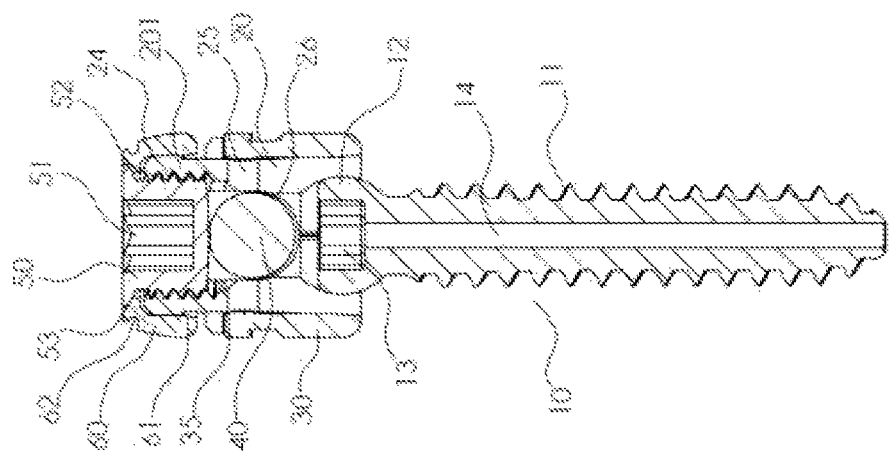
FIG. 10C is a sectional view of assembled polyaxial spinal screw of FIG. 10A.
Figure 11C:
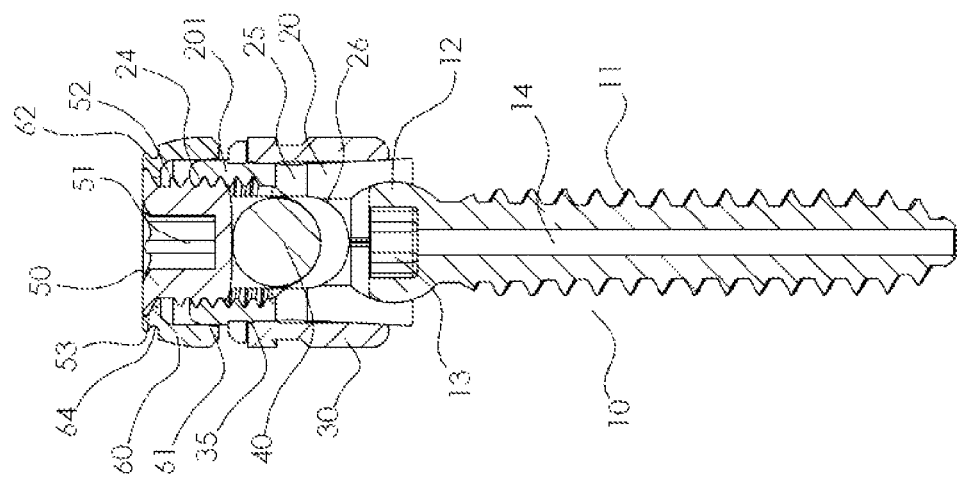
FIG. 11C is a sectional view of pre-assembled polyaxial spinal screw of FIGS. 11A and 11B, where the set screw 50 is not tightened yet.
Figure 11B:
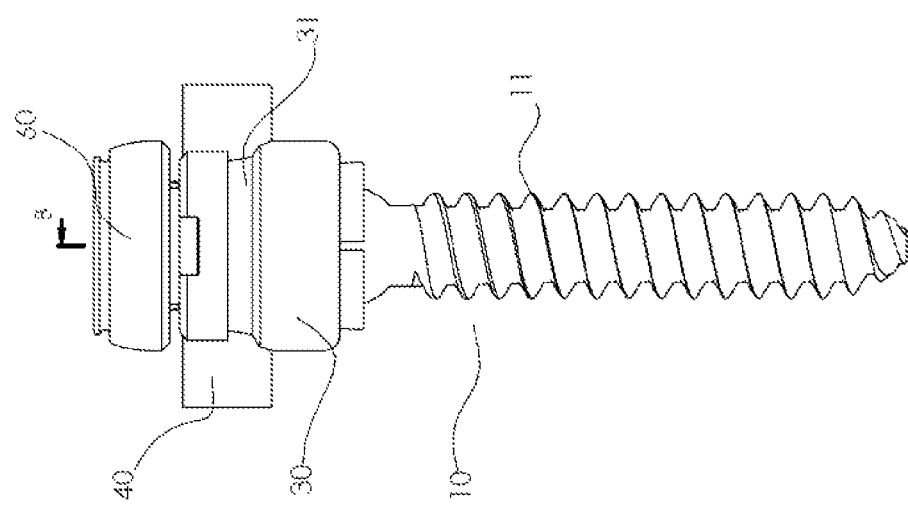
FIG. 11B is another side view of pre-assembled polyaxial spinal screw of FIG. 11A, where the set screw 50 is not tightened yet.
Figure 11A:
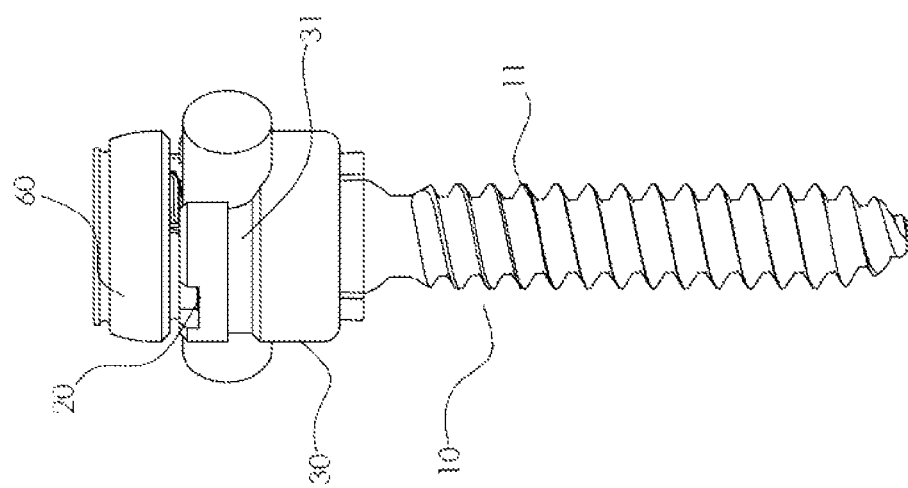
FIG. 11A is a side view of pre-assembled polyaxial spinal screw as shown in FIG. 9 where a set screw 50 is not tightened yet.
Figure 12A:
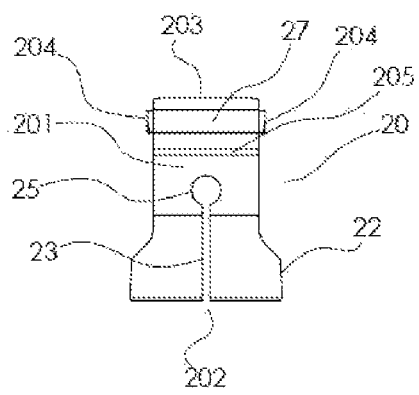
FIG. 12A is a side view of a coupling 20 of another embodiment, which further comprises a coupling downwards movement stopper 205 and a hook 204 on each end of a step 27 of the coupling 20.
Figure 12B:
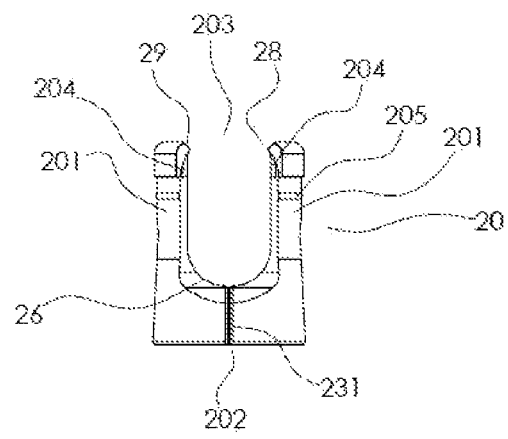
FIG. 12B is another side view of the coupling 20 of FIG. 12A.
Figure 12C:
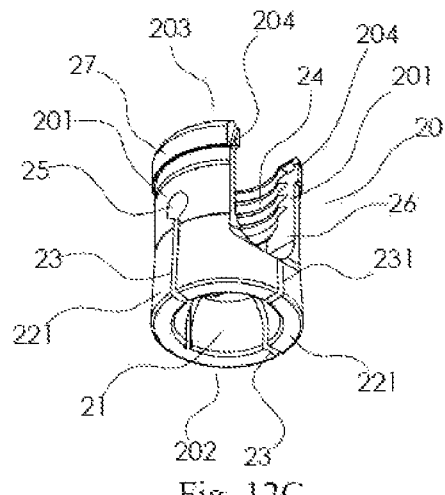
FIG. 12C is a bottom perspective view of the coupling 20 of FIGS. 12A and 12B.
Figure 12D:
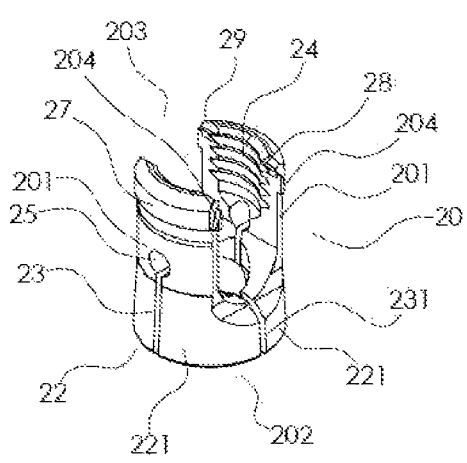
FIG. 12D is a top perspective view of the coupling 20 of FIGS. 12A-12C.
Figures 18A, 18B, 18C:
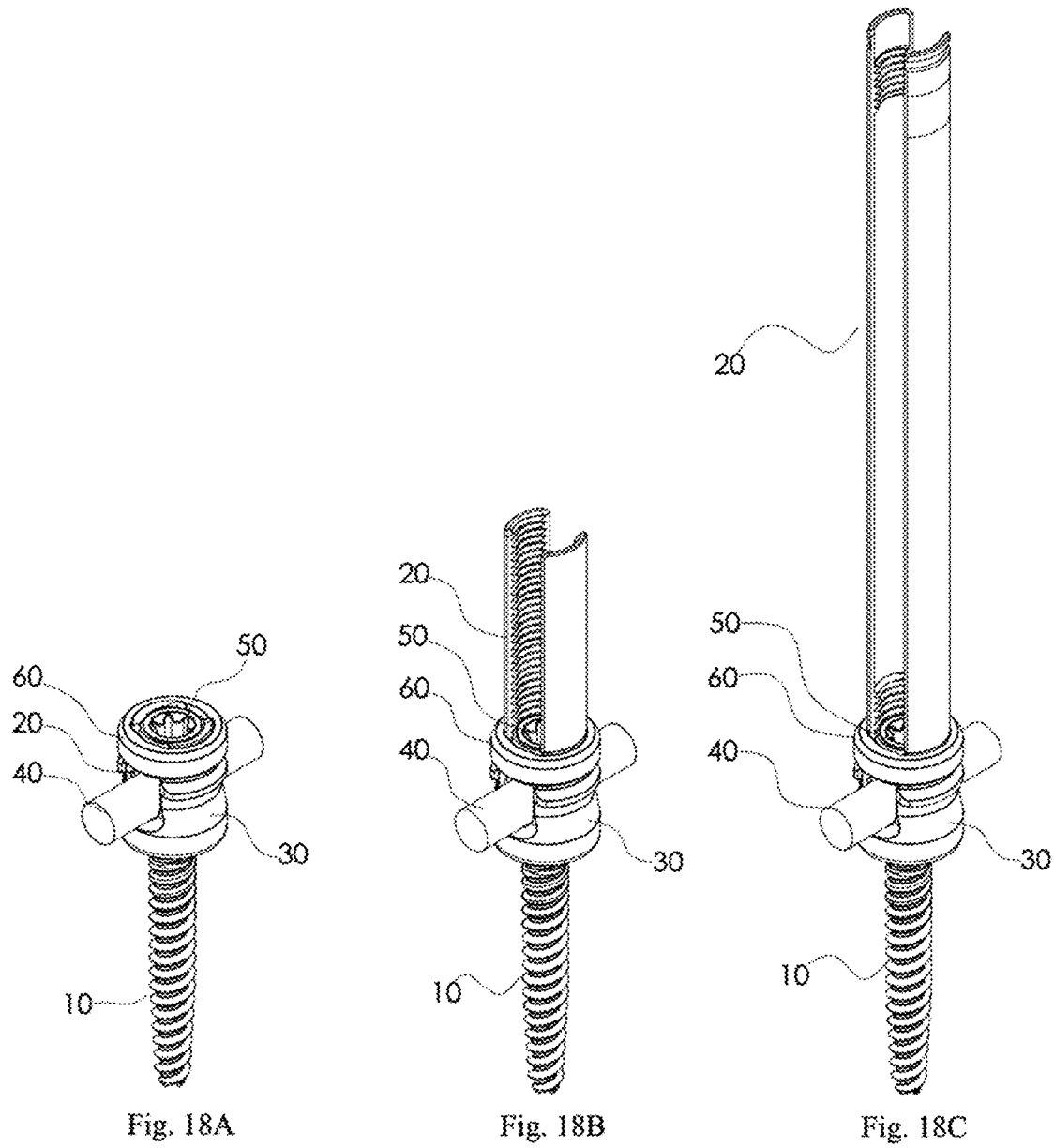
FIG. 18A is a perspective view of assembled polyaxial spinal screw of another embodiment with a shaft 10, coupling 20, sleeve 30 set screw 50 and a collar 60 with a collar gap 66.
FIG. 18B is a perspective view of assembled polyaxial spinal screw of another embodiment with a shaft 10, coupling 20 with extended tabs 209, sleeve 30, set screw 50 and a collar 60 with a gap 66.
FIG. 18C is a perspective view of assembled polyaxial spinal screw of another embodiment with a shaft 10, coupling 20 with extended tabs 209 and retaining means 208, sleeve 30, set screw 50 and a collar 60 with a gap 66.
Figures 21A, 21B:
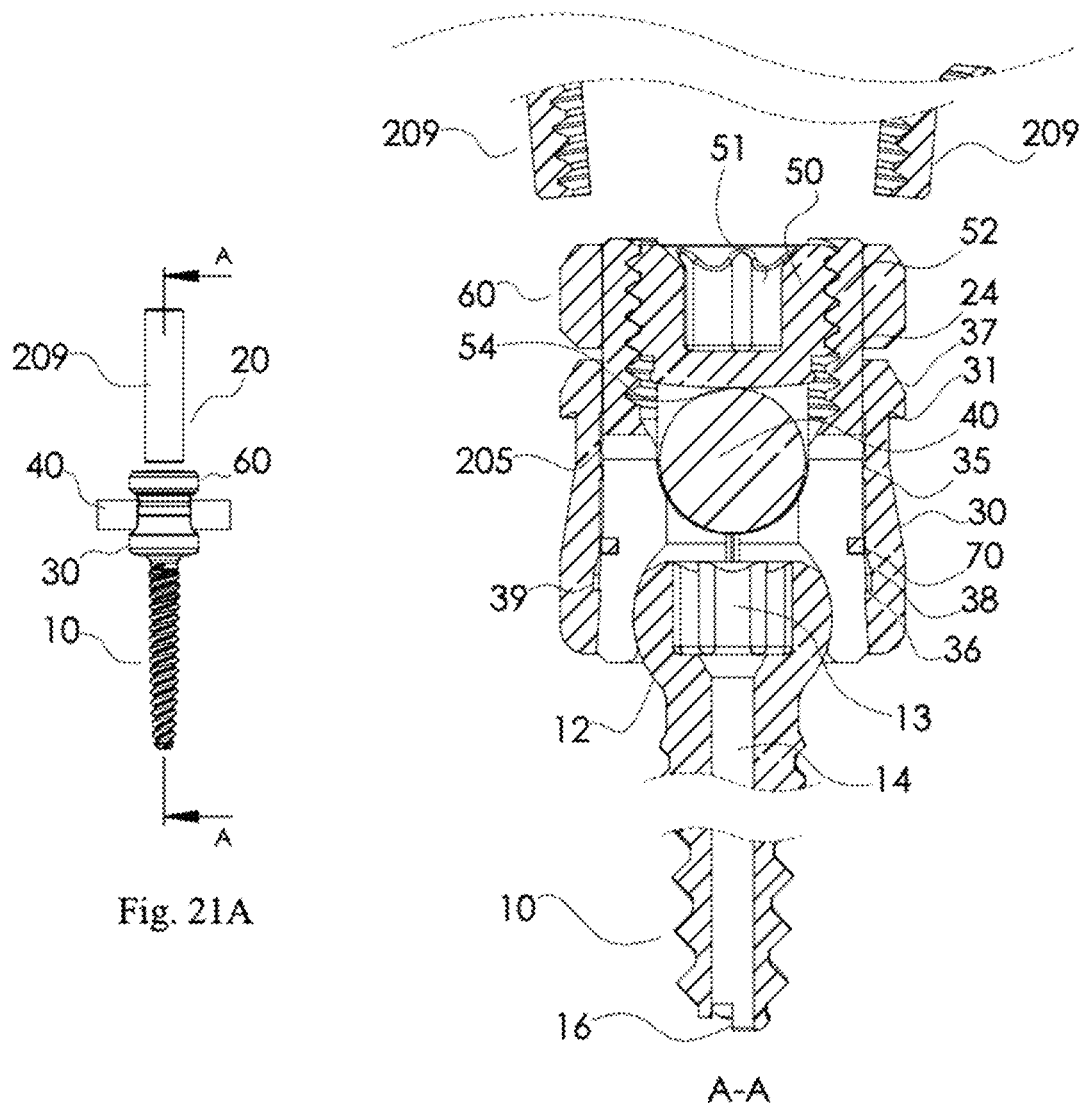
FIG. 21A is a side view of assembled polyaxial spinal screw of another embodiment with a shaft 10, coupling 20 with the extended tab 209, sleeve 30, set screw 50 and a collar 60 with the collar gap 66 where the set screw 50 is finally tightened and the reduction tab bodies 209 are removed.
FIG. 21B is a section view of assembled polyaxial spinal screw of another embodiment with a shaft 10, coupling 20 with the extended tab 209, sleeve 30, set screw 50 and a collar 60 with the collar gap 66 where the set screw 50 is finally tightened and the reduction tab bodies 209 are removed of the FIG. 21A.

FIGS. 18A, 18B and 18C are other embodiments of the polyaxial spinal screw shown in FIGS. 1, 3 and 9. The polyaxial spinal screws in that modification comprises the screw shaft 10, a coupling 20 with extended tabs 209, a sleeve 30, a stabilizing rod 40, a set screw 50 and a collar 60 with collar gaps 66 and optionally locking ring 70. All of them compromises different embodiments of the coupling 20. The polyaxial spinal screws are in the assembled and tightened condition. The extended tabs 209 on the FIG. 18B and FIG. 18C are not removed. Such longitudinally prolonged extended tabs 209 of the coupling design are well known to be used during the minimally invasive fusion of the patient's vertebra. Tightening of stabilizing rod 40 is achieved by the set screw 50 and collar 60 construction combination.

The embodiments of the polyaxial spinal screw shown of FIGS. 18A, 18B and 18C doesn't change the polyaxial pedicle screw shown on the FIGS. 1, 3 and 9 principle of operation but only improves and raise the safety of operation.

FIGS. 19A and 19B displays a side view of the polyaxial spinal screw with locking ring 70 in the pre-assembled condition when the stabilizing rod 40 is inserted into the slot and compromises with the sleeve 30, but the set screw 50 and a collar 60 construction is not mounted yet. FIG. 19B displays the cross section of the side view from the FIG. 19A.

FIGS. 19C and 19D displays a side view of the polyaxial spinal screw with locking ring 40 in the assembled condition when the set screw 50 is tightened and the stabilizing rod is inserted into the slot and compromises with the sleeve 30. FIG. 19D displays the cross section of the side view from the FIG. 19C.

The coupling 20, displayed in the sets of FIGS. 18A, 19A, 19B, 19C, 19D, 26A, 26B, and 26C, performs almost the same way as described before about the coupling 20 of FIGS. 6A, 6B, 6C and 6D with the equal functionality and characterize with additional elements like a coupling downwards movement stopper 205, a concentration groove 210 and a ring groove 211.

A sleeve 30, displayed in the sets of FIGS. 18A, 18B, 18C, 19A, 19B, 19C, 19D, 20A, 20B, 20C, 20D, 21A, 21B, 22A, 22B, 22C, 23A, 23B, 23C, 24A, 24B, 24C, 29A, 29B, 29C and 29D, performs the same functionality of the mentioned elements and characterized with additional elements of this embodiment like: sleeve downwards movement stopper 35, sleeve upwards movement stopper 36, a sliding chamfer 37, a ring compression cone 38, an expanded ring groove 39.

A set screw 50 and a collar 60 construction displayed on the FIGS. 18A, 18B, 18C, 19A, 19B, 19C, 19D, 20A, 20B, 20C, 20D, 21A, 21B, 22A, 22B, 22C, 23A, 23B, 23C, 24A, 24B, 24C, 30A, 30B, 30C, 30D and 30E performs the same functionality of the mentioned elements and characterized with additional elements of the embodiments like: a set screw pressing surface 54, a collar petals 61, a petals bevels 65, a collar gaps 66.

A locking ring 70 displayed in the FIGS. 19B, 19D, 20B, 20D, 21B, 22C, 23C, 24C and 31 is an additional assembly element in the polyaxial spinal screw of another embodiments.

A position of the coupling downwards movement stopper 205 on the wall of coupling 201 near the distal end 203 and position of downwards sleeve movement stopper 35 prevents the possibility of the sleeve 30 longitudinal movement in the proximal end 202 of the coupling 20 and undesired collet 22 and screw head 12 blocking.

The locking ring 70 by its interaction with the sleeve upwards movement stopper 36 and located into the ring grove 212 and groove for the expanded ring 39 prevents the movement of the sleeve 30 in the longitudinal direction to the distal end 203 of the coupling 20 which prevents the collet 22 from the undesired opening and screw head 12 pop up during the screw insertion procedure.

FIG. 19D shows the cross section of the assembled polyaxial spinal screw of FIG. 19C. This is the moment when the set screw 50 and the collar 60 construction are mounted by the means of the preconfigured surgical tool inserted into the tool recess of a set screw 51 and screwed into the inner thread 24 of the coupling 20. The force from the thread pushes the construction of the set screw 50 and a collar 60 into the direction of the coupling 20 proximal end 202 and interacts through a set screw pressing surface 54 to the stabilizing rod 40 and the sleeve 30 slot 32. In this moment a collar gap 66 which is a gap between the set screw 50 threaded portion 52 and the collar inner circumferential surface takes coupling walls 201 into and prevents them from the loosening. In that manner the sleeve 30 is pushed into the proximal direction of coupling 202 and specific form of the sleeve downwards movement stopper 35 overcome the barrier of the coupling downwards movement stopper 205, the ring compression cone 38 pushes the locking ring 70 and a locking ring 70 shrinks and dives into the ring groove 211. Ring can expand and shrink in the limits of its elastic deformation because of the ring recess 701. The interaction between the collet 22 and the sleeve 30 is the same as described before. This action locks the collet 22 which blocks the screw head 12 in the desired position achieved by the means of the polyaxial spinal screw.

The same interaction principle between the coupling 20, sleeve 30, set screw 50, collar 60 and the locking ring 70 presents into another embodiments of the polyaxial spinal screw displayed in the FIGS. 18B, 18C, 20A, 20B, 20C, 20D, 21A, 21B, 22A, 22B, 22C, 23A, 23B, 23C, 24A, 24B and 24C.

A set of FIGS. 20A, 20B, 20C, 20D, 21A and 21B displays another embodiment of the polyaxial spinal screw. This embodiment of the coupling provides the possibility of the stabilizing rod 40 reduction by the means of the inner thread 24. A set screw 50 threaded portion 52 provides the possibility of the controlled rod insertion through all depth of slot 26. After the final tightening displayed on the FIG. 20D the extended tab 209 bodies must be removed. It happens by the mean of the special preconfigured surgical tool by swinging motions. To help overcome the resistance of the material special concentration grooves 210 are located in the outer surface of the coupling wall 201. These grooves are the place where material will break and the extended tab 209 bodies can be safely removed as it displayed on the FIG. 21A and cross section 21B.

Figure 22A:
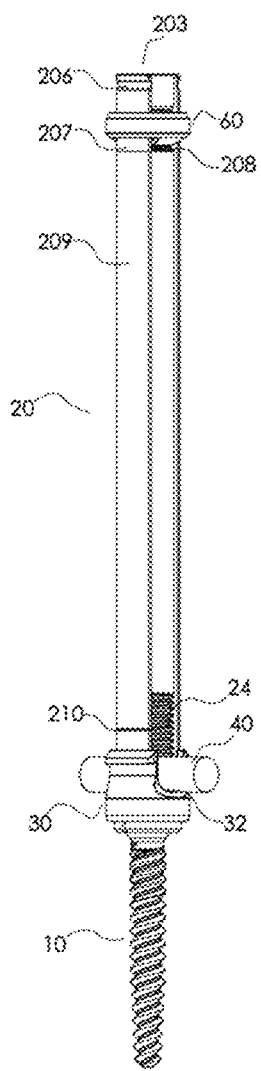
FIG. 22A is a perspective view of pre-assembled polyaxial spinal screw of another embodiment with a shaft 10, coupling 20 with the extended tab 209, sleeve 30, set screw 50 and a collar 60 with the collar gap 66 where the construction of the set screw 50 and a collar 60 is fitted on the retaining means 208.
Figure 22B:
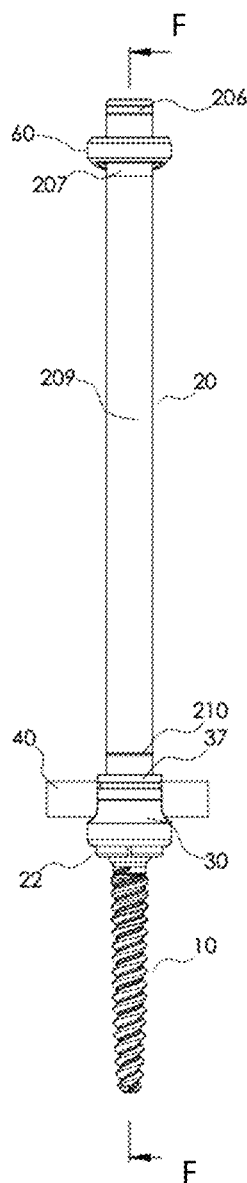
FIG. 22B is a side view of pre-assembled polyaxial spinal screw of another embodiment with a shaft 10, coupling 20 with the extended tab 209, sleeve 30, set screw 50 and a collar 60 with the collar gap 66 where the construction of the set screw 50 and a collar 60 is fitted on the tab retaining means 208.
Figure 22C:
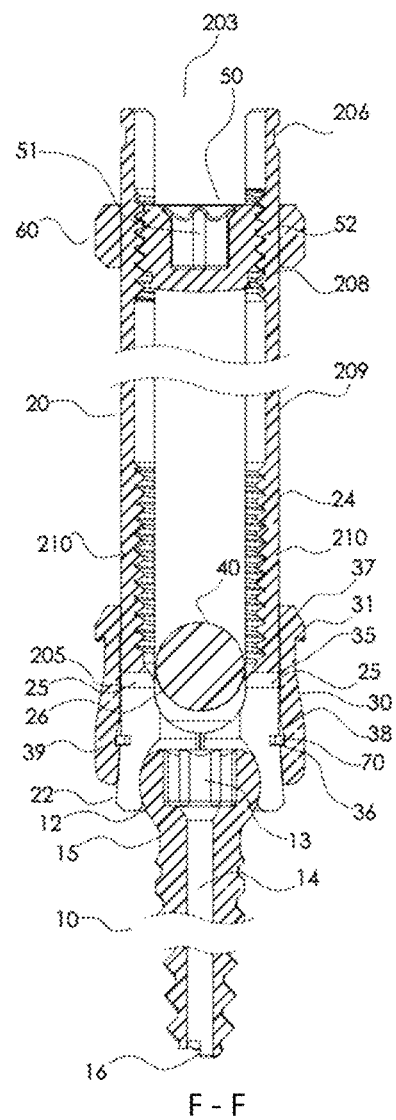
FIG. 22C is a section view of pre-assembled polyaxial spinal screw of another embodiment with a shaft 10, coupling 20 with extended tab 209, sleeve 30, set screw 50 and a collar 60 with the collar gap 66 where the construction of the set screw 50 and a collar 60 is fitted on the tab retaining means 208 of the FIG. 22B.

FIGS. 22A, 22B, and 22C displays another embodiment of the polyaxial spinal screw with another embodiment of coupling 20. This is the pre-assembled condition of the polyaxial spinal screw where set screw 50 and collar 60 construction is mounted on the retaining means 208 as example a thread on inner or outer surfaces of the extended tabs 209. A tool connection groove 206 is used for the tool and the screw engagement during the procedure of screw insertion in to the patient's vertebra. Locking ring 70 is in an expanded position and a collet 22 is not locked. All other portions of engagement and interaction between the parts are the same as described previously.

Figure 23A:
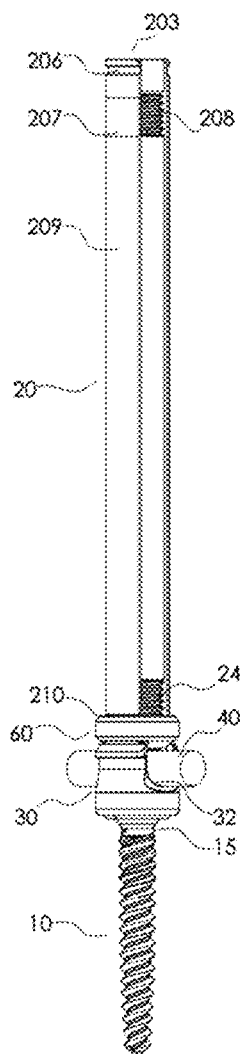
FIG. 23A is a perspective view of the assembled polyaxial spinal screw of another embodiment with a shaft 10, coupling 20 with the extended tab 209, sleeve 30, set screw 50 and a collar 60 with the collar gap 66 where the construction of the set screw 50 is finally tightened.
Figure 23B:
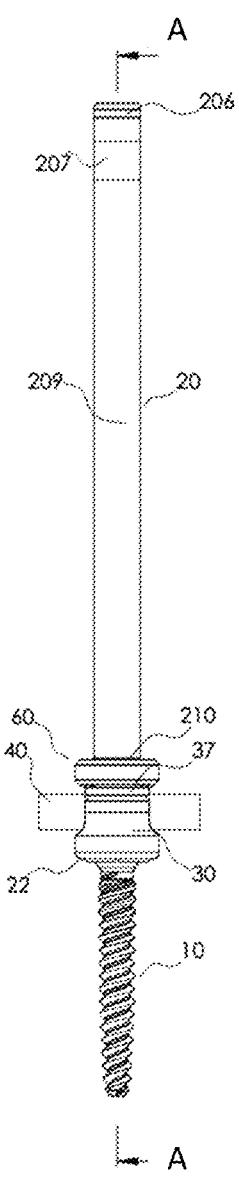
FIG. 23B is a side view of the assembled polyaxial spinal screw of another embodiment with a shaft 10, coupling 20 with the extended tab 209, sleeve 30, set screw 50 and a collar 60 with the collar gap 66 where the construction of the set screw 50 is finally tightened.
Figure 23C:
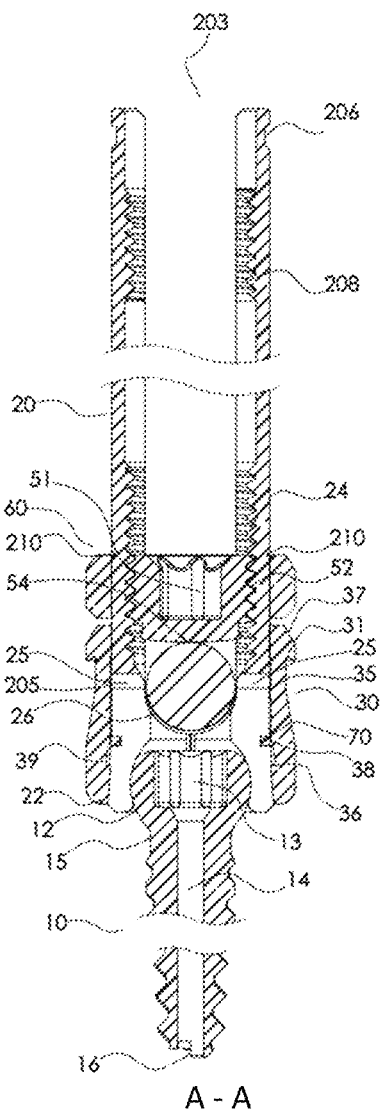
FIG. 23C is a section view of the assembled polyaxial spinal screw of another embodiment with a shaft 10, coupling 20 with the extended tab 209, sleeve 30, set screw 50 and a collar 60 with the collar gap 66 where the construction of the set screw 50 is finally tightened of the FIG. 22B.
Figure 24A:
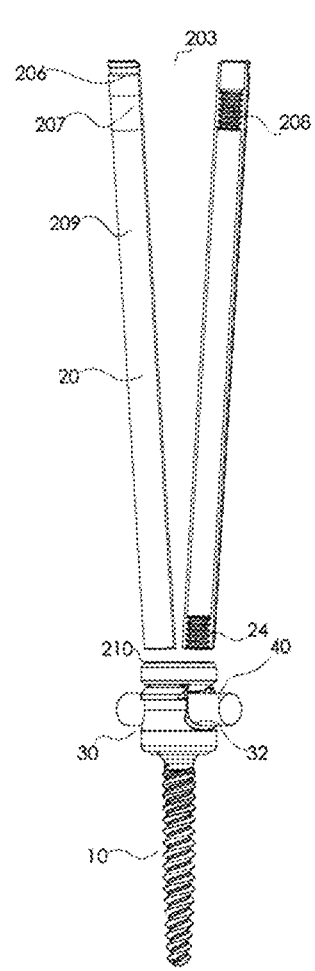
FIG. 24A is a perspective view of the assembled polyaxial spinal screw of another embodiment with a shaft 10, coupling 20 with the extended tab 209, sleeve 30, set screw 50 and a collar 60 with the collar gap 66 where the construction of the set screw 50 is finally tightened and the bodies of the extended tab 209 are removed.
Figure 24B:
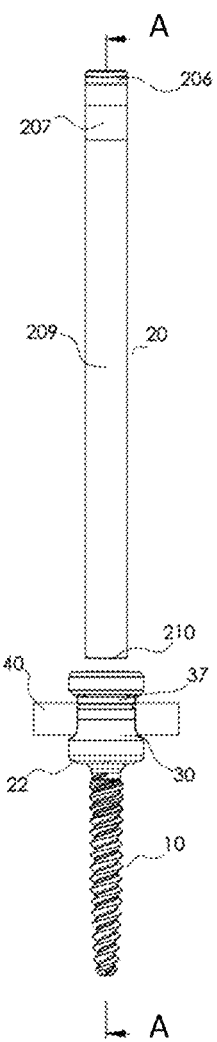
FIG. 24B is a side view of the assembled polyaxial spinal screw of another embodiment with a shaft 10, coupling 20 with the extended tab 209, sleeve 30, set screw 50 and a collar 60 with the collar gap 66 where the construction of the set screw 50 is finally tightened and the bodies of the extended tab 209 are removed.
Figure 24C:
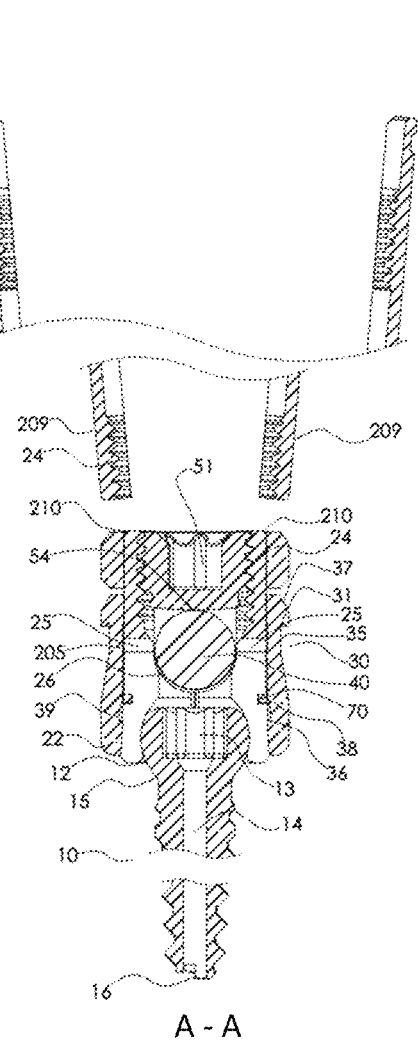
FIG. 24C is a section view of the assembled polyaxial spinal screw of another embodiment with a shaft 10, coupling 20 with the extended tab 209, sleeve 30, set screw 50 and a collar 60 where the construction of the set screw 50 is finally tightened and the bodies of the extended tab 209 are removed of the FIG. 24B.

FIGS. 23A, 23B, and 23C displays the assembled condition of the polyaxial spinal screw from the FIG. 22A. In this condition the set screw 50 and a collar 60 construction is located under the concentration groove 210 and the sleeve 30, locking ring 70 and a collet 22 are in the locked position. Set screw 50 is finally tightened.

After the final tightening the extended tab 209 bodies should be removed through the same procedure as it described previously of FIGS. 21A and 21B. This is displayed in FIGS. 24A, 24B and 24C.

Figure 25A:
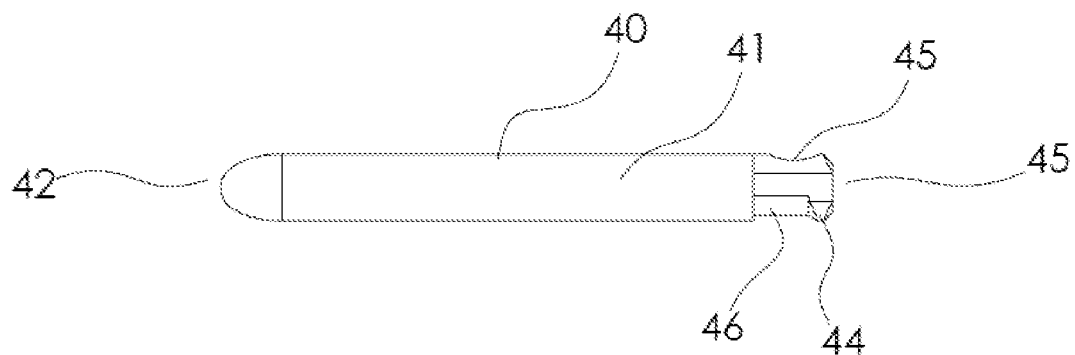
FIG. 25A is a side view of the stabilizing rod 40.
Figure 25B:
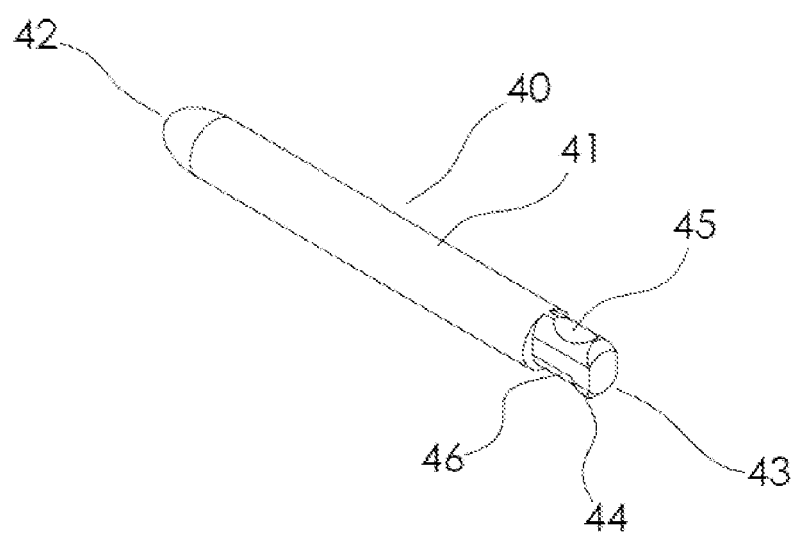
FIG. 25B is a perspective view of the stabilizing rod 40.

FIGS. 25A and 25B displays a stabilizing rod 40. Stabilizing rod 40 compromises a stabilizing rod body 41 which is inserted into a slot 26 of the coupling and pushes to the slot of a sleeve 32. Distal end of the rod 42 is formed for easy access through a patient's tissue. Proximal end of the rod 43 is an end which connects to the preconfigured surgical tool which is used for rod insertion procedure. Stabilizing rod ledge 44 prevents a rod from undesired connection loss with the instrument. Rod fixation notch 45 provides a possibility to safely lock of the stabilizing rod 40 into the preconfigured surgical instrument during a rod insertion procedure. Rod fixation tail 46 prevents a stabilizing rod 40 from transverse movement when it is connected with the tool.

FIGS. 26A, 26B and 26C displays another embodiment of the coupling 20 with a ring groove 211 and the coupling downwards movement stopper 205 which engagements and mode of action was described before.

FIGS. 27A, 27B and 27C displays another embodiment of the coupling 20 with extended tabs 209 with the ring groove 211, concentration groove 210 and the coupling downwards movement stopper 205 which engagements and mode of action is described before.

FIGS. 28A, 28B and 28C displays another embodiment of the coupling 20 with extended tabs 209 with the ring groove 211, concentration groove 210, retaining means 208 and the coupling downwards movement stopper 205 which engagements and mode of action is described before.

FIGS. 29A, 29B, 29C and 29D displays another embodiment of the sleeve 30 where a sliding chamfer 37 is located at the distal end of the sleeve 303 which helps the preconfigured surgical tool overcome the shape of it and provides the engagement of the tool and a circumferential groove 31.

A set screw 50 integration into a collar 60 with the gap shown in the FIGS. 30A, 30B, 30C, 30D and 30E. The cross section displayed on the FIG. 30B shows a connection point 53 of the collar and a set screw by means of collar petals 61. This holds the set screw 50 and the collar 60 together and prevents loosening of them with ability to radially rotate relative to each other. Petals 61 could have special bevels 65 or fillets that helps put them on the coupling.

FIG. 31 displays the locking ring 70 and its ring recess 701 which mode of action is described previously.

The invention has been described with reference to various specific and illustrative embodiments and techniques. However, one skilled in the art will recognize that many variations and modifications may be made while remaining within the scope of the invention as defined in the appended claims.

LIST OF REFERENCES

10—a screw shaft;
11—a thread section of a screw shaft;
12—a screw head;
13—a tool recess;
14—a channel;
15—a screw neck;
16—a self-tapping notches;
20—a coupling;
201—a wall of a coupling;
202—a proximal end of a coupling;
203—a distal end of a coupling;
204—a hook;
205—a coupling downwards movement stopper;
206—a tool connection groove;
207—identification of retaining means;
208—a retaining means;
209—a extended tab;
210—a concentration groove;
211—a ring groove;
21—a spherical cut;
22—a collet;
221—a lug;
23—a kerf cut;
231—a full cut;
24—an inner thread;
25—a hole;
26—a slot;
27—a step;
28—a boss;
29—a chamfer;
30—a sleeve;
302—a proximal end of a sleeve;
303—distal end of a sleeve;
31—a circumferential groove;
311—a tool positioning hole;
32—a slot of a sleeve;
33—a recess of a sleeve;
34—a notch;
341—a sleeve ledge;
35—a sleeve downwards movement stopper;
36—a sleeve upwards movement stopper;
37—a sliding chamfer;
38—a ring compression cone;
39—a groove for the expanded ring;
40—a stabilizing rod;
41—a stabilizing rod body;
42—a distal end of the rod;
43—a proximal end of the rod;
44—a stabilizing rod ledge;
45—a rod fixation notch;
46—a rod fixation tail;
50—a set screw;
51—a tool recess of a set screw;
52—a threaded portion of a set screw;
53—a connection point of a collar and a set screw;
54—a set screw pressing surface;
60—a collar;
61—a collar petal;
62—a collar fillet;
63—a flange of a collar;
64—a circumferential groove of the collar;
65—a petals bevel;
66—a collar gap;
70—a locking ring;
701—a ring recess.

The invention claimed is:

1. A polyaxial spinal screw for implants for correcting and stabilizing a spinal cord, wherein the polyaxial spinal screw comprises:
a screw shaft (10) having a thread section (11) with a bone thread and a spherical segment-shaped screw head (12);
a coupling (20) with a bore therethrough, wherein the coupling (20) has a proximal end (202) that is near the screw shaft (10) when assembled and a distal end (203) opposite to the proximal end (202) of the coupling (20), wherein the coupling (20) at the proximal end (202) comprises a spherical cut (21) sized to receive the screw head (12) of the screw shaft (10), wherein the spherical cut (21) has at least two kerf cuts (23) and at least one full cut (231) spaced in a circumferential direction around the coupling (20) resulting in at least two lugs (221) which extend to each other in the axial direction of the coupling (20) and can be bent outward in an elastic manner, wherein a hole (25) is formed at an end of each kerf cut (23), wherein a diameter of the hole (25) is larger than a width of each kerf cut (23), wherein the coupling (20) further comprises two slots (26) open at the distal end (203) of the coupling (20) for receiving a stabilizing rod (40), the two slots (26) form two walls (201) positioned opposite to each other, wherein the coupling (20) comprises an inner thread (24) on an inner surface of the two walls (201) and at the distal end (203) of the coupling (20);

a sleeve (30) with a bore therethrough, wherein the sleeve (30) has a proximal end (302) that is closer to the proximal end (202) of the coupling (20) when assembled and a distal end (303) opposite to the proximal end (302) of the sleeve (30), wherein the sleeve (30) comprises at least two slots (32) open at the distal end (303) of the sleeve (30) for receiving a stabilizing rod (40) and at least two recesses (33) at the distal end (303) of the sleeve (30) for fixation of the polyaxial spinal screw by auxiliary tools, wherein the sleeve (30) further comprises at least two positioning notches (34) arranged on an inner surface of the sleeve (30) near the slots (32) for eliminating further rotation of the sleeve (30) and for alignment of the slots (32, 33) of the sleeve (30) with the slots (26) of the coupling (20); and a set screw (50) comprising a collar (60), wherein the set screw (50) is configured to be threaded into the inner thread (24) of the coupling (20) for fixing a stabilizing rod (40), wherein the collar (60) further comprises a gap (66), wherein the gap (66) receives the walls (201) or an extended tab (209) of the coupling (20) upon assembly in such way that the walls (201) or extended tab (209) of the coupling (20) are retained against opening or extension in a radial direction.

2. The polyaxial screw according to claim 1, wherein the polyaxial screw further comprises a locking ring (70) positioned between the coupling (20) and the sleeve (30), wherein the coupling (20) further comprises a ring groove (211) configured to receive the locking ring (70);

the sleeve (30) further comprises a sleeve upwards movement stopper (36) configured for retaining by the locking ring (70), a ring compression cone (38) to gradually compress the locking ring (70) when the cone (38) slides in the direction to the proximal end of the coupling (20);

wherein the coupling (20) in combination with the sleeve (30) and the locking ring (70) creates a holding-locking construction, which prevents the sleeve (30) from undesired upward movement in the distal (203) direction of the coupling (20) and compresses the proximal end of the coupling (20) around the screw head (12).

3. The polyaxial screw according to claim 1, wherein the coupling (20) further comprises a coupling downwards movement stopper (205);

the sleeve (30) further comprises a sleeve downwards movement stopper (35); and the coupling downwards movement stopper (205) in combination with the sleeve downwards movement stopper (35) creates a holding-locking construction, which prevents the sleeve (30) from undesired sliding in the proximal (202) direction of the coupling (20).

4. The polyaxial screw according to claim 1, wherein the coupling (20) further comprises a retaining means (208) and a tool connection groove (206) at the distal end of the coupling (20).

5. The polyaxial screw according to claim 1, wherein the outer diameter of the coupling (20) at the proximal end (202) thereof is larger than the outer diameter of the coupling (20) formed by the two walls (201).

6. The polyaxial screw according to claim 1, wherein the inner diameter of the sleeve (30) at the proximal end (302) is larger than the inner diameter of the sleeve (30) at the distal end (303).

7. The polyaxial screw according to claim 1, wherein the inner diameter of the sleeve (30) at the proximal end (302) thereof is smaller than an outer diameter of the coupling (20) at the proximal end (202) thereof in such a manner that upon assembly the sleeve (30) moves onto the coupling (20) and the lugs (221) of the coupling (20) are radially moved within the limits of its elasticity towards the screw head (12) fixating a position of the screw shaft (10) relative to the coupling (20) and the sleeve (30).

8. The polyaxial screw according to claim 1, wherein the collar (60) and the set screw (50) are configured to be able to radially rotate relative to each other.

9. The polyaxial screw according to claim 1, wherein the sleeve (30) further comprises a circumferential groove (31) arranged on the outer surface of the sleeve (30).

10. The polyaxial screw according to claim 1, wherein the polyaxial screw further comprises a stabilizing rod (40), wherein a proximal end (43) of the stabilizing rod is configured to be connected to a preconfigured insertion surgical tool; and wherein a stabilizing rod ledge (44) is configured to prevent a stabilizing rod (40) from undesired connection loss with the preconfigured insertion surgical tool; and wherein a rod fixation notch (45) is configured to provide a lock of the stabilizing rod (40) into the preconfigured surgical instrument during the stabilizing rod (40) insertion procedure; and wherein a rod fixation tail (46) is configured to prevent the stabilizing rod (40) from transverse movement when it the stabilizing rod (40) is connected with the preconfigured insertion surgical tool.

11. The polyaxial screw according to claim 1, wherein the extended tabs (209) are in the form of elongation of the wall of the coupling (201) in the distal end (203) direction and a concentration groove (210) located under the extended tabs (209) of the coupling (20) in order to help breaking the extended tabs (209).

12. The polyaxial screw according to claim 1, wherein the coupling (20) further comprises a boss (28) formed at the distal end (203) of the coupling (20) on an inner surface of both walls (201) and extends radially inwards from both walls (201) of the coupling (20), wherein a distance between the bosses (28) of both walls (201) is smaller than a diameter of the stabilizing rod (40) to be inserted so that the stabilizing rod (40) can be inserted in locking manner.

13. The polyaxial screw according to claim 1, wherein the screw head (12) has a tool recess (13) for bringing into engagement with a screw driver and the set screw (50) has a tool recess (51) for bringing into engagement with a screw driver.

14. The polyaxial screw according to claim 1, wherein the screw shaft (10) comprises a channel (14) extending therethrough in axial direction of the screw shaft (10) and further comprises radial channels extending from the channel (14) to the side surface of the screw shaft (10).

15. The polyaxial screw according to claim 1, wherein a hook (204) is formed at each end of a step (27) of the coupling (20).

16. The polyaxial screw according to claim 1, wherein the collar (60) further comprises a circumferential groove (64) on the outer surface of the collar (60).

17. The polyaxial screw according to claim 1, wherein the sleeve (30) further comprises a tool positioning hole (311).

\* \* \* \* \*